United States Patent
Takeda et al.

(10) Patent No.: US 9,464,710 B2
(45) Date of Patent: Oct. 11, 2016

(54) SWITCHING DEVICE

(71) Applicant: ALPS ELECTRIC CO., LTD., Tokyo (JP)

(72) Inventors: Hironori Takeda, Miyagi-ken (JP); Kenji Kawano, Miyagi-ken (JP)

(73) Assignee: ALPS ELECTRIC CO., LTD., Tokyo (JP)

( * ) Notice: Subject to any disclaimer, the term of this patent is extended or adjusted under 35 U.S.C. 154(b) by 61 days.

(21) Appl. No.: 14/505,360

(22) Filed: Oct. 2, 2014

(65) Prior Publication Data
US 2015/0107971 A1    Apr. 23, 2015

(30) Foreign Application Priority Data
Oct. 22, 2013   (JP) ................. 2013-219125

(51) Int. Cl.
*H01H 3/16*    (2006.01)
*F16H 59/12*   (2006.01)
(Continued)

(52) U.S. Cl.
CPC .............. *F16H 59/12* (2013.01); *H01H 13/14* (2013.01); *H01H 13/20* (2013.01); *H01H 13/52* (2013.01); *H01H 1/365* (2013.01); *H01H 1/403* (2013.01); *H01H 2013/525* (2013.01); *H01H 2221/036* (2013.01); *H01H 2221/06* (2013.01); *H01H 2221/08* (2013.01); *H01H 2231/026* (2013.01); *H01H 2300/02* (2013.01)

(58) Field of Classification Search
CPC ...... H01H 39/00; H01H 39/004; H01H 9/10; H01H 9/32; H01H 9/16; H01H 1/365; H01H 85/0445; H01H 71/12; H01H 71/123; H01H 83/20; H01H 3/12; H01H 3/02; H01H 15/00; H01H 15/08; H01H 15/10; H01H 15/16; H01H 2003/00; H01H 205/00; H01H 2221/00; H01H 2221/014; H01H 13/52; H01H 13/20; H01H 2221/036; H01H 2221/08; H01H 2221/06; H01H 1/403; H01H 2300/02; B60R 16/04; F16H 59/12
USPC ..... 200/502, 5 R, 5 EA, 537, 547, 549, 550, 200/16 E, 178, 51 R, 51.02, 531, 56, 3, 252, 200/241; 439/188, 66
See application file for complete search history.

(56) References Cited

U.S. PATENT DOCUMENTS 4,057,520 A * 11/1977 Schwartz ............. H01H 15/005
200/16 D

FOREIGN PATENT DOCUMENTS

JP    11-245680    9/1999

*Primary Examiner* — Renee Luebke
*Assistant Examiner* — Anthony R. Jimenez
(74) *Attorney, Agent, or Firm* — Beyer Law Group LLP

(57) ABSTRACT

A switching device has a substrate having a fixed contact portion, a slider, a first moving member having an inclined portion and a first engagement portion and being reciprocable on a first imaginary axis line, a first biasing member, a second moving member having a contact portion and a second engagement portion and being reciprocable on a second imaginary axis line, and a second biasing member biasing the second moving member, in which the first and second moving members are supported to be reciprocable in a state of bringing the inclined portion and the contact portion into sliding contact with each other, the slider comes into contact with and is separated from the fixed contact portion according to the reciprocation of the first moving member, and the first and second moving members are connected by the first engagement portion and the second engagement portion so as to be reciprocable.

6 Claims, 18 Drawing Sheets

(51) Int. Cl.
*H01H 13/14* (2006.01)
*H01H 13/52* (2006.01)
*H01H 13/20* (2006.01)
*H01H 1/36* (2006.01)
*H01H 1/40* (2006.01)

SWITCHING DEVICE

CLAIM OF PRIORITY

This application claims benefit of Japanese Patent Application No. 2013-219125 filed on Oct. 22, 2013, which is hereby incorporated by reference.

BACKGROUND OF THE INVENTION

1. Field of the Invention

The present invention relates to a switching device and particularly, to a switching device which can reliably return to the initial state.

2. Description of the Related Art

As a transmission of an automobile, in the related art, there are many transmissions of a lever type or a paddle type operation manner. However, in recent years, use of a transmission of a button type operation manner has begun to increase. In a switching device which is used as a button of the transmission of a button type operation manner, a switching device is often adopted in which it is possible to switch an electrical connection by pressing a button from a direction perpendicular to a substrate provided inside. Gear shifting is performed by switching the electrical connection of the switching device. However, if a force to press the button is applied perpendicularly to the substrate, the substrate is bent, and thus a problem such as a component provided in the periphery falling off or a disposition position being shifted is of concern. For this reason, a structure is often used in which if the button is pressed in a direction perpendicular to the substrate, a component different from the button is moved in a direction along the substrate surface and switching of an electrical connection is performed. In such a switching device, a direction conversion mechanism of an engine starting device described in Japanese Unexamined Patent Application Publication No. 11-245680 is often used.

Hereinafter, the direction conversion mechanism described in Japanese Unexamined Patent Application Publication No. 11-245680 will be described using FIGS. 17 and 18. FIG. 17 is a cross-sectional view showing the configuration of a direction conversion mechanism 900 used in a lever device described in Japanese Unexamined Patent Application Publication No. 11-245680. FIG. 18 is a cross-sectional view showing a configuration in a case where the direction conversion mechanism 900 described in Japanese Unexamined Patent Application Publication No. 11-245680 has been operated.

The engine starting device described in Japanese Unexamined Patent Application Publication No. 11-245680 has a cylinder 906, an operation knob 908, an ignition switch 907, a return spring 922, a lock knob 930, and a biasing spring 929. In addition, the engine starting device described in Japanese Unexamined Patent Application Publication No. 11-245680 can start an engine by making the operation knob 908 and the ignition switch 907 engage each other and operating the ignition switch 907. The cylinder 906 has a main body section 906b formed in a cylindrical shape, and an accommodation chamber 906a provided so as to protrude outward from the main body section 906b. The operation knob 908 and the ignition switch 907 are accommodated in the main body section 906b in a state where the return spring 922 is disposed therebetween, and thus the operation knob 908 and the ignition switch 907 are biased in a direction away from each other.

The lock knob 930 is accommodated in the accommodation chamber 906a and is biased by the biasing spring 929, thereby protruding between the operation knob 908 and the ignition switch 907 in the main body section 906b. The lock knob 930 is movable in a direction against the biasing force of the biasing spring 929. However, usually, the lock knob 930 is locked by the magnetic force of a built-in electromagnet 933. For this reason, even if an attempt to move the operation knob 908 in a direction against the biasing force of the return spring 922 is made in order to start an engine, the operation knob 908 is blocked by the lock knob 930, and thus it is not possible to start the engine. If the energization of the electromagnet 933 is released, the lock knob 930 becomes movable in a direction against the biasing force of the biasing spring 929. In this state, if the operation knob 908 is moved in a direction against the biasing force of the return spring 922, the operation knob 908 comes into contact with an inclined surface portion 930a provided in the lock knob 930, and thus the lock knob 930 moves in a direction against the biasing force of the biasing spring 929. The lock knob 930 moves in this manner, whereby the operation knob 908 and the ignition switch 907 are engaged with each other, and thus it is possible to operate the ignition switch 907. In addition, a mechanism to move the operation knob 908, thereby bringing the operation knob 908 into contact with the inclined surface portion 930a provided in the lock knob 930 and moving the lock knob 930 in a direction different from a moving direction of the operation knob 908 is regarded as the direction conversion mechanism 900.

The direction conversion mechanism 900 described in Japanese Unexamined Patent Application Publication No. 11-245680 is used for a switching device, whereby a problem of concern such as a component provided in the periphery falling off or a disposition position being shifted due to the substrate being bent by a force to press the button is solved.

However, in the direction conversion mechanism 900 described in Japanese Unexamined Patent Application Publication No. 11-245680, when the engagement of the operation knob 908 and the ignition switch 907 is released, a case is assumed in which only the operation knob 908 returns to the initial position and the lock knob 930 cannot return to the initial position due to some trouble. If such a phenomenon occurs in a switching device using the direction conversion mechanism 900, even though it is the initial position in appearance, there is no any change even if an operation is made, and thus there is a risk of causing confusion to an operator.

SUMMARY OF THE INVENTION

The present invention provides a switching device which can reliably return to the initial state.

According to an aspect of the invention, there is provided a switching device including: a substrate provided with a fixed contact portion; a slider configured to be able to come into contact with and be separated from the fixed contact portion; a first moving member provided with an inclined portion inclined with respect to the substrate, and configured to be able to reciprocate on a first imaginary axis line parallel to the substrate; a first biasing member configured to bias the first moving member; a second moving member provided with a contact portion coming into sliding contact with the inclined portion, and configured to be able to reciprocate on a second imaginary axis line intersecting the first imaginary axis line; and a second biasing member configured to bias the second moving member, in which the first biasing member biases the first moving member so as to move the first moving member in a first direction that is a direction toward an intersection of the first imaginary axis line and the second imaginary axis line, the second biasing member biases the second moving member so as to move the second moving member in a second direction that is a direction away from the intersection, and the first moving member and the second moving member are respectively supported so as to be able to reciprocate in a state of bringing the inclined portion and the contact portion into sliding contact with each other, the slider is retained by the first moving member, the slider comes into contact with and is separated from the fixed contact portion according to a reciprocating movement of the first moving member, the first moving member is provided with a first engagement portion, the second moving member is provided with a second engagement portion, and the first moving member and the second moving member are connected by the first engagement portion and the second engagement portion so as to be able to reciprocate each other.

In the switching device according to the aspect of the invention, the first engagement portion may be formed in a rod shape or a ring shape, the second engagement portion may be formed in a ring shape in a case where the first engagement portion is of a rod shape, and be formed in a rod shape in a case where the first engagement portion is of a ring shape, and the first engagement portion and the second engagement portion may be connected by inserting one side formed in a rod shape into the other side formed in a ring shape, without contact.

In the switching device according to the aspect of the invention, the second biasing member may bias the second moving member through a pressing member, the second moving member may have a cam portion with which the pressing member comes into contact, on a side surface which does not intersect the second imaginary axis line, the cam portion may be composed of a plurality of continuous inclined surfaces, and a distance between the second imaginary axis line and the cam portion may become wider as it goes toward the second direction.

In the switching device according to the aspect of the invention, the cam portions may be formed so as to form a symmetrical shape with the second imaginary axis line interposed therebetween, on the two side surfaces facing in opposite directions.

In the switching device according to the aspect of the invention, the switching device may be for an operation of a transmission for a vehicle.

According to the aspect of the invention, a configuration is made in which the first moving member and the second moving member are connected by the first engagement portion and the second engagement portion so as to be able to reciprocate each other. In use of the switching device, a state is assumed in which after the pressing operation on the second moving member is stopped, the first moving member trying to return to the position before an operation has difficulty to return for a reason such as small foreign matter being caught. In such a case, since the first engagement portion of the first moving member and the second engagement portion of the second moving member are engaged with each other, the first moving member is biased not only by the first biasing member, but also by the second biasing member in the same direction as the first biasing member. Therefore, even in a state where in the configuration of the related art, the return is not made due to foreign matter being caught, the first moving member pushes the foreign matter away and easily returns to the position before an operation.

Accordingly, the effect of being able to provide a switching device capable of reliably returning to the initial state is exhibited.

According to the aspect of the invention, due to a configuration in which a connection is made by inserting the first engagement portion into the second engagement portion without contact or inserting the second engagement portion into the first engagement portion without contact, the effect of being able to perform a connection without interfering with the reciprocation movements of the first engagement portion and the second engagement portion is exhibited.

According to the aspect of the invention, a configuration is made in which the cam portion composed of a plurality of continuous inclined surfaces is provided on the side surface which does not intersect the second imaginary axis line of the second moving member and the cam portion is biased through the pressing member. By adjusting the inclination angle of the inclined surface with respect to the side surface, it is possible to optionally adjust a feeling of a click at the time of an operation. Further, the cam portion has a configuration in which the distance between the second imaginary axis line and the cam portion becomes wider as it goes toward the second direction, whereby when the second moving member is pressed in a reverse direction to the second direction and then, the pressing operation is released, it is possible to move the second moving member in the second direction by the biasing force of the second biasing member, thereby returning the second moving member to the initial position. Therefore, the effect of being able to provide a switching device in which the adjustment of an operation feeling is easy and which can reliably return to the initial position is exhibited.

According to the aspect of the invention, the cam portions are provided so as to form a symmetrical shape with the second imaginary axis line interposed therebetween, on two side surfaces facing in opposite directions, whereby the second moving member is biased so as to be sandwiched between the two pressing members, and therefore, it becomes difficult for the second moving member to tilt to one side. Therefore, deterioration of an operation feeling due to the second moving member being tilted and becoming caught on other components hardly occurs. Accordingly, the effect of being able to provide a switching device having a better operation feeling is exhibited.

According to the aspect of the invention, the switching device is used for an operation of the transmission for a vehicle, whereby the effect of being able to perform more reliable switching of gear shifting, whereby a driver can drive an automobile without being confused by switching failure, is exhibited.

DESCRIPTION OF THE PREFERRED EMBODIMENTS

First Embodiment

Hereinafter, a switching device 100 in a first embodiment will be described.

Figure 1:
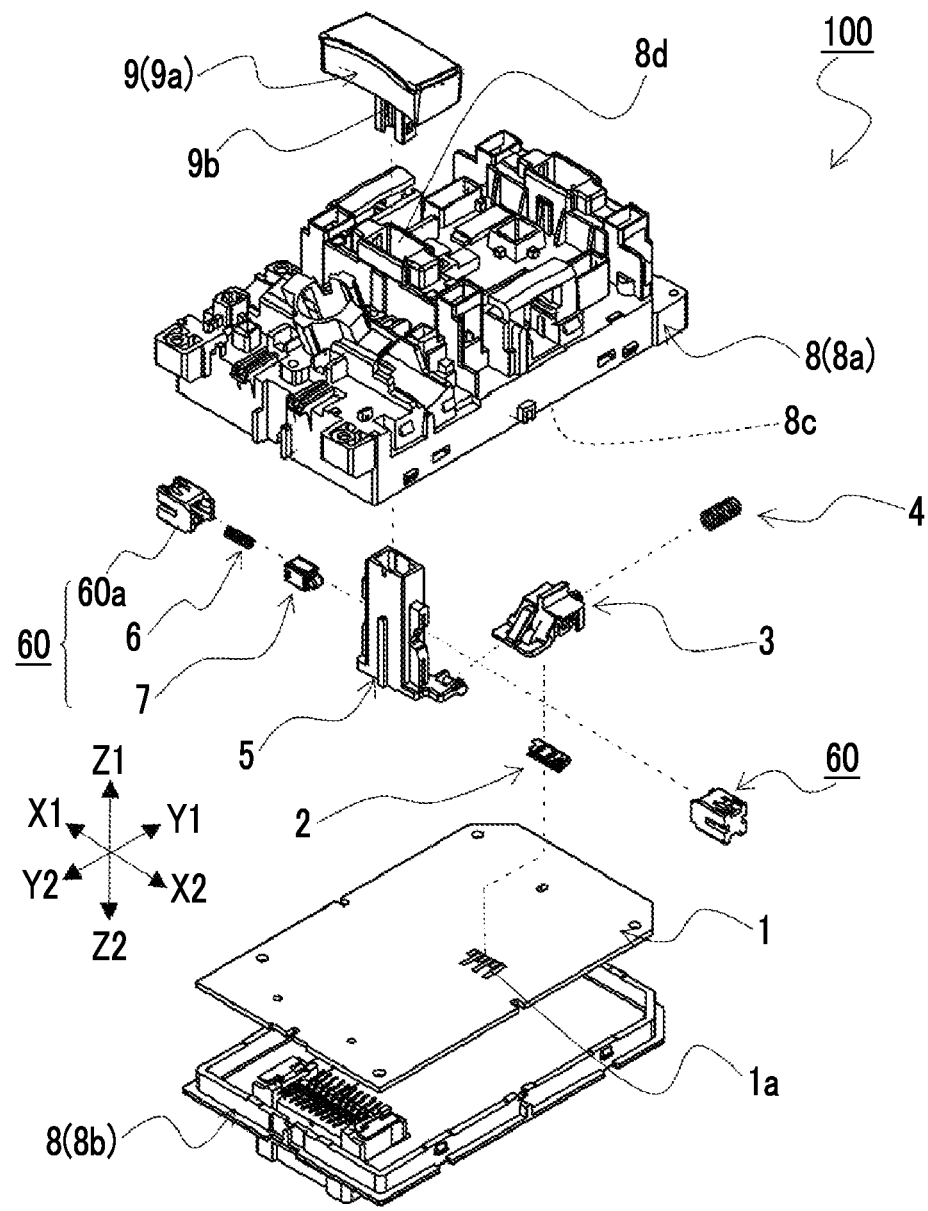
FIG. 1 is an exploded perspective view showing the configuration of a switching device in a first embodiment.
Figure 2:
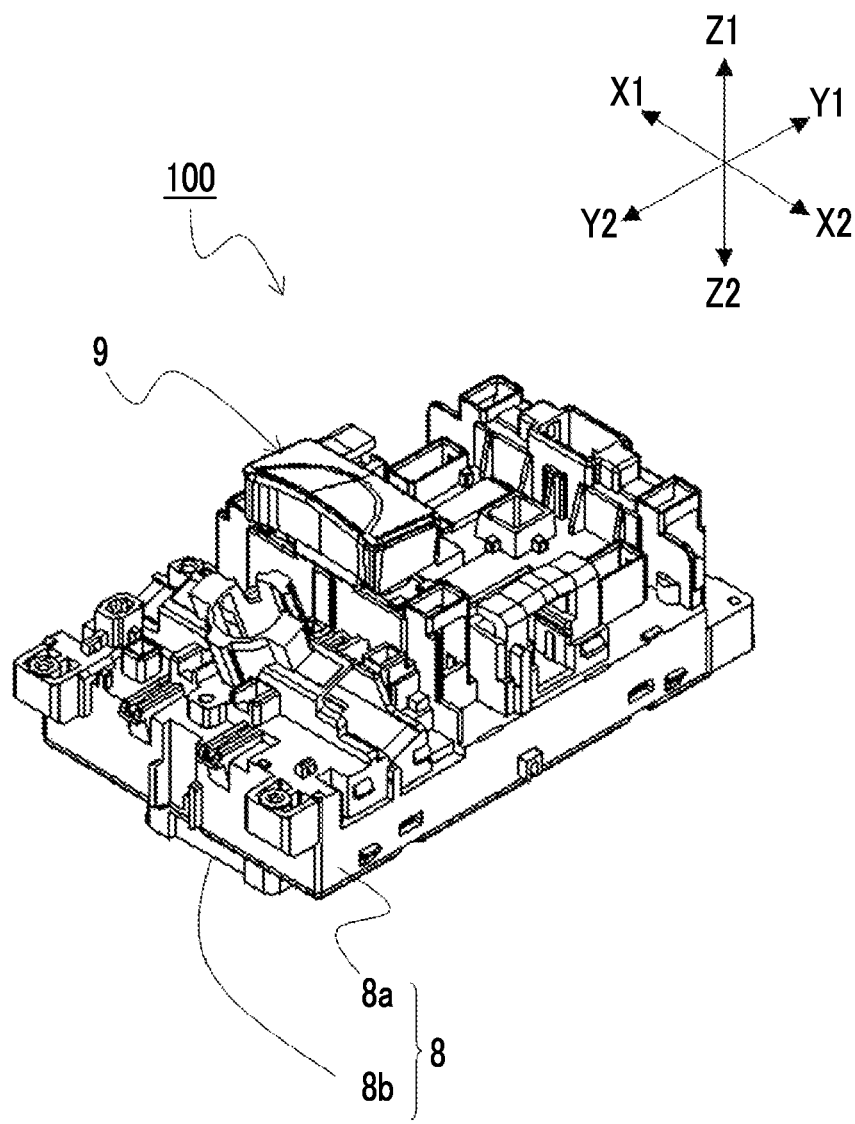
FIG. 2 is a perspective view showing the external appearance of the switching device in the first embodiment.
Figure 3:
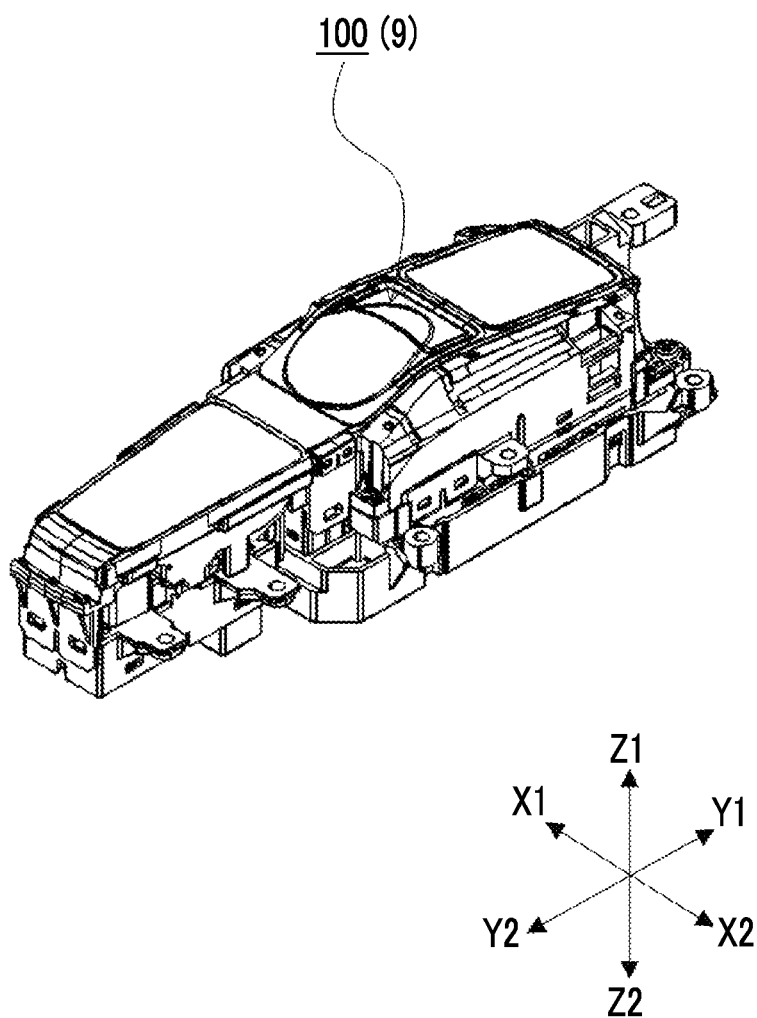
FIG. 3 is a perspective view showing an example of an external appearance in a case where the switching device in the first embodiment is used as a switching device for an operation of a transmission for a vehicle.
Figure 4:
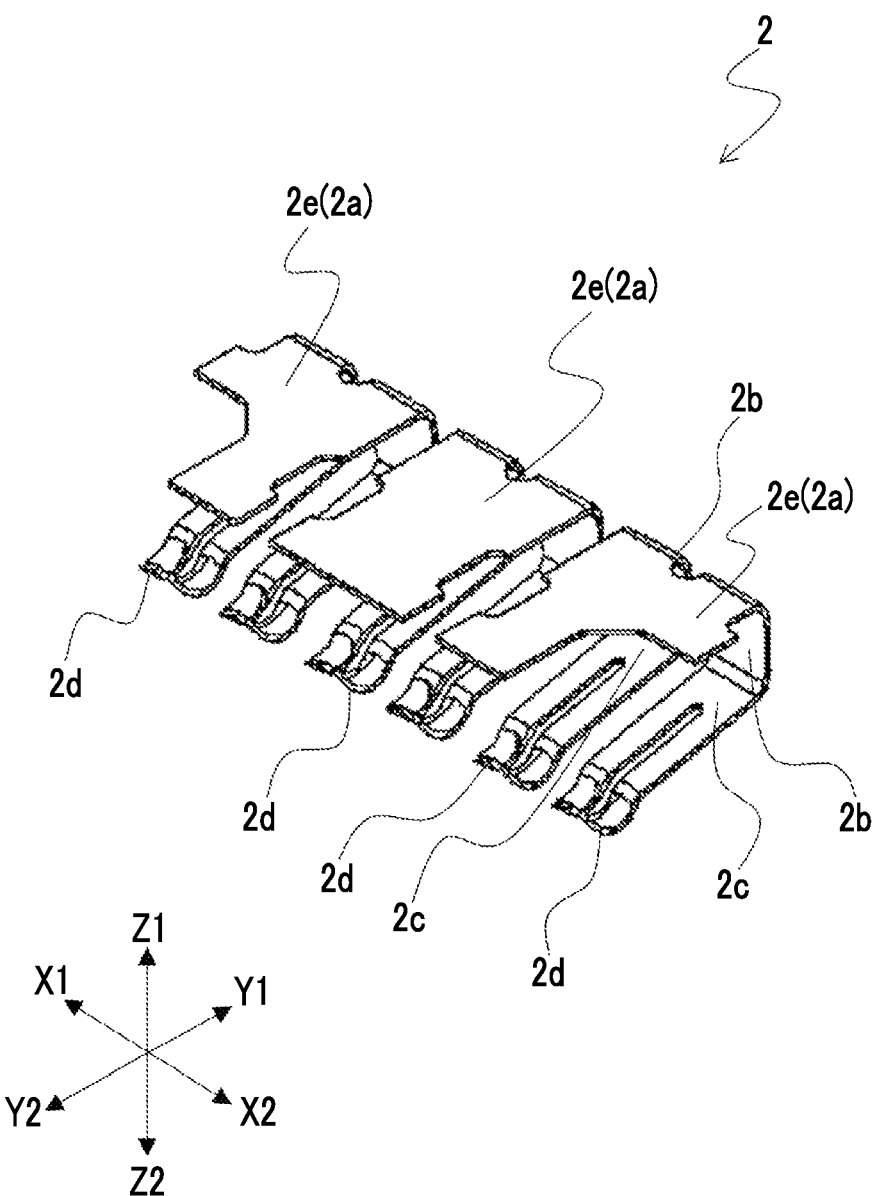
FIG. 4 is a perspective view showing the external appearance of a slider in the first embodiment.
Figure 5A:
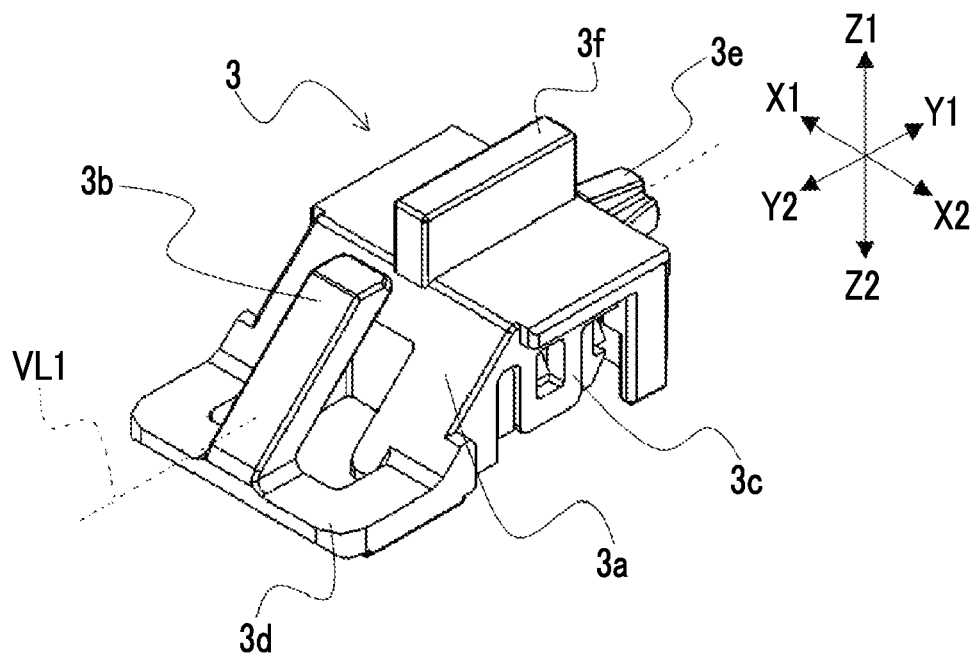
FIGS. 5A and 5B are diagrams showing a first moving member in the first embodiment.
Figure 5B:
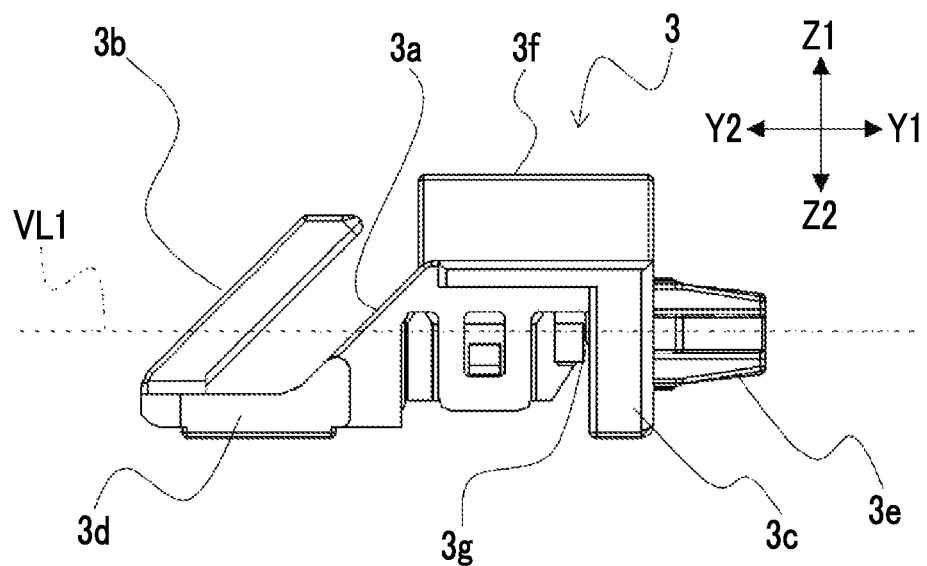
Figure 6A:
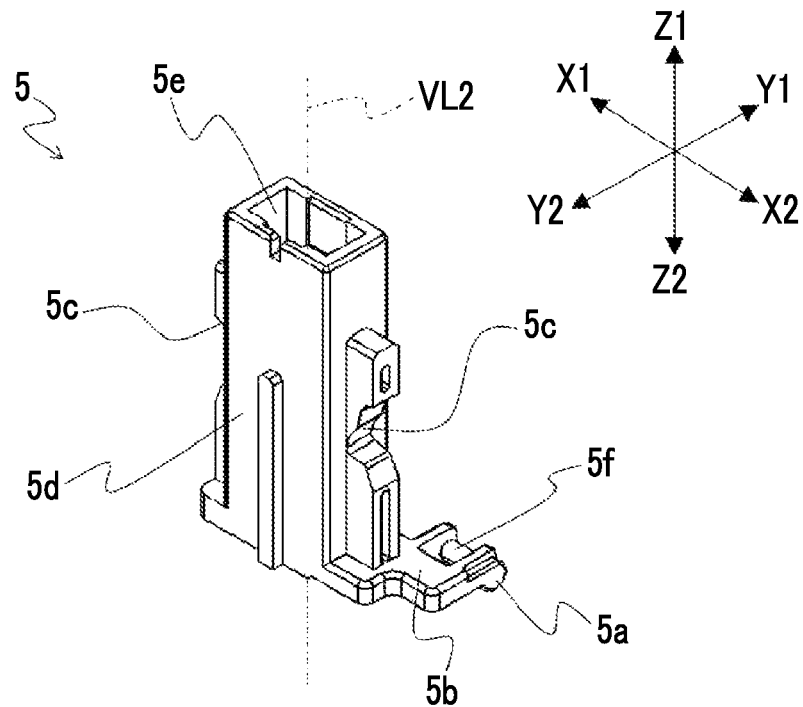
FIGS. 6A and 6B are diagrams showing a second moving member in the first embodiment.
Figure 6B:
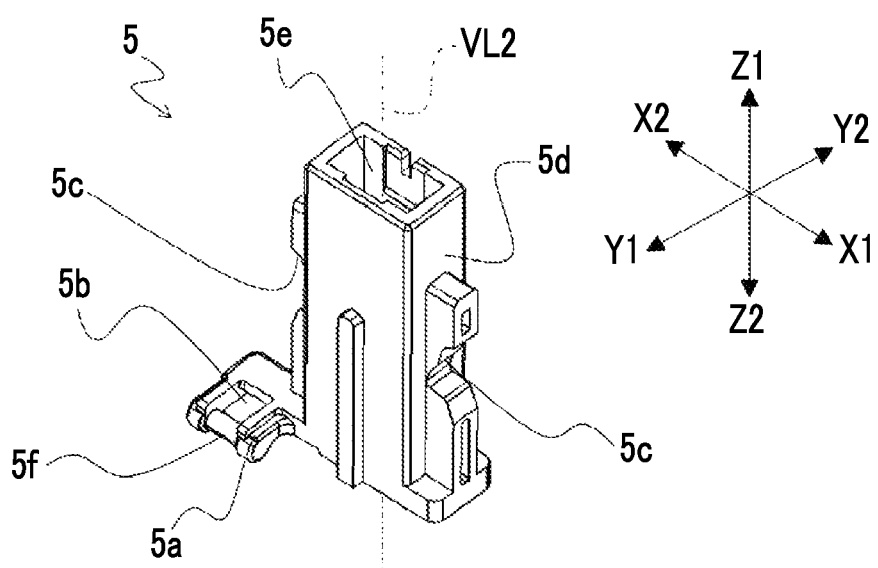
Figure 7A:
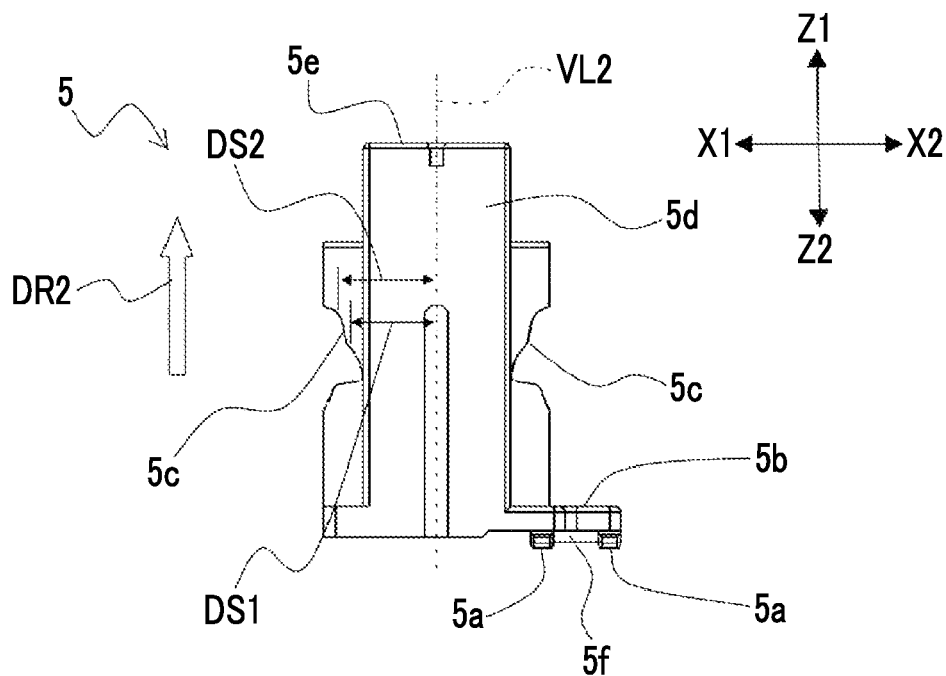
FIGS. 7A and 7B are diagrams showing the second moving member in the first embodiment.
Figure 7B:
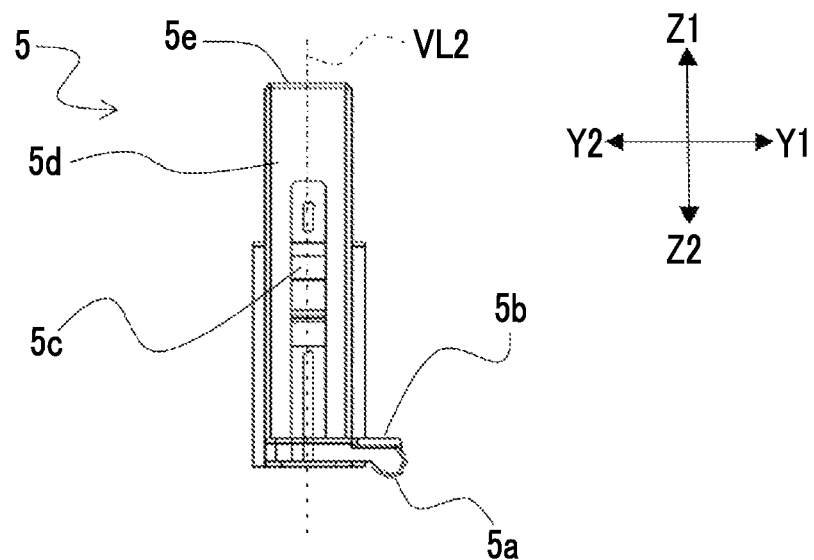
Figure 8A:
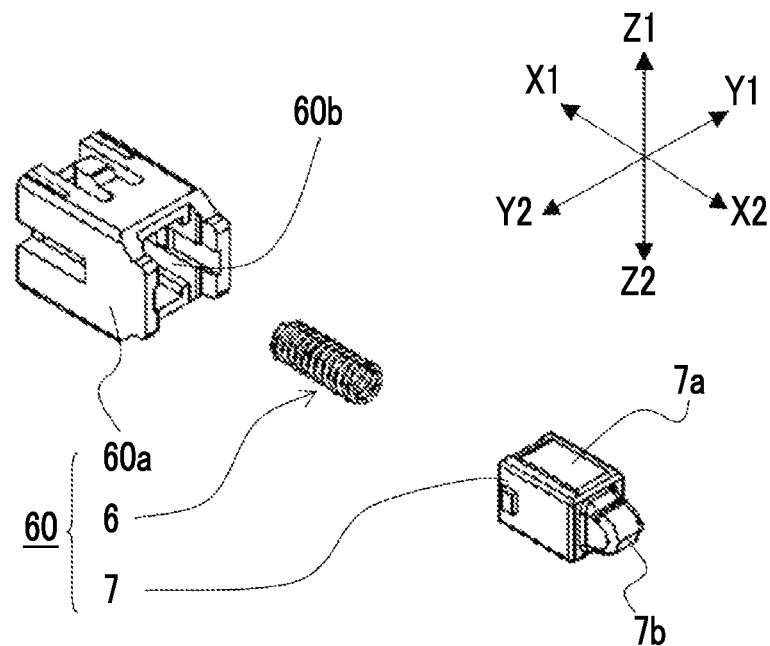
FIGS. 8A and 8B are diagrams showing a biasing unit in the first embodiment.
Figure 8B:
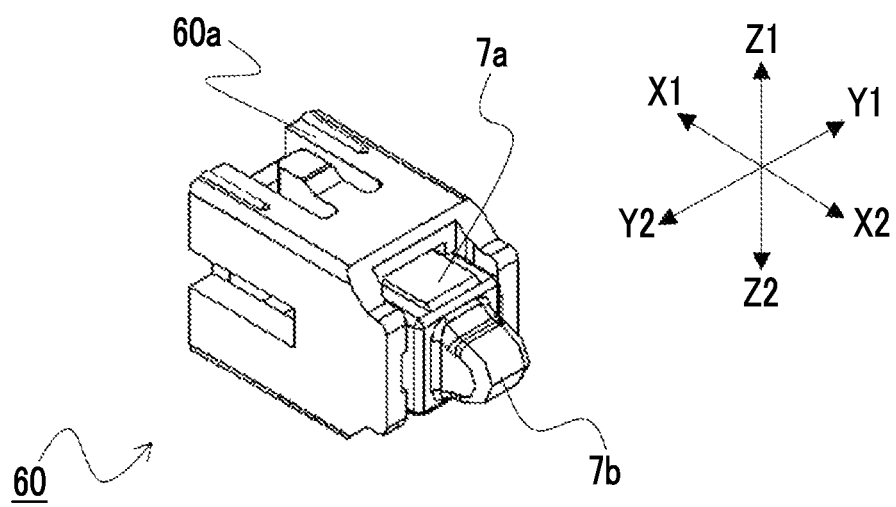
Figure 9:
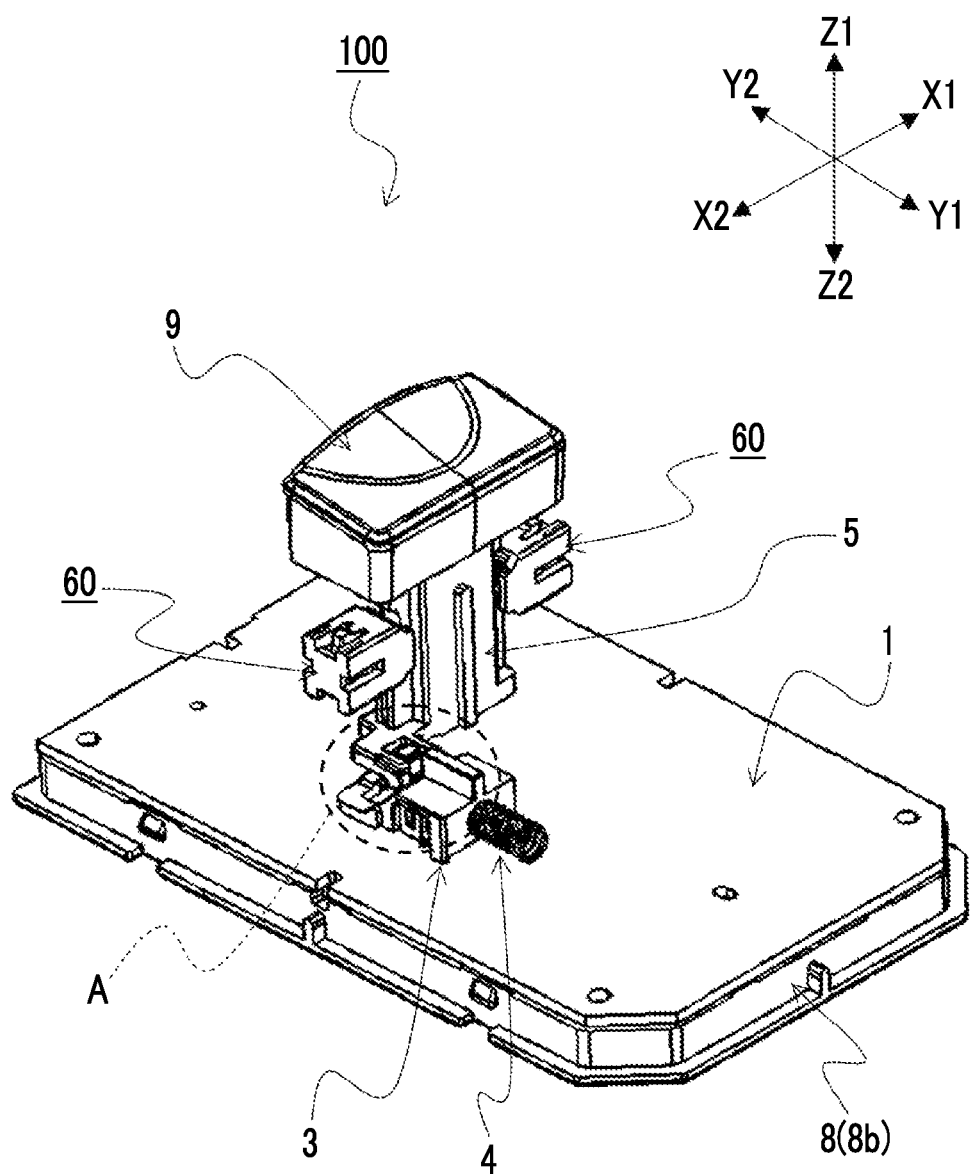
FIG. 9 is a perspective view showing the structure of the switching device in the first embodiment.
Figure 12A:
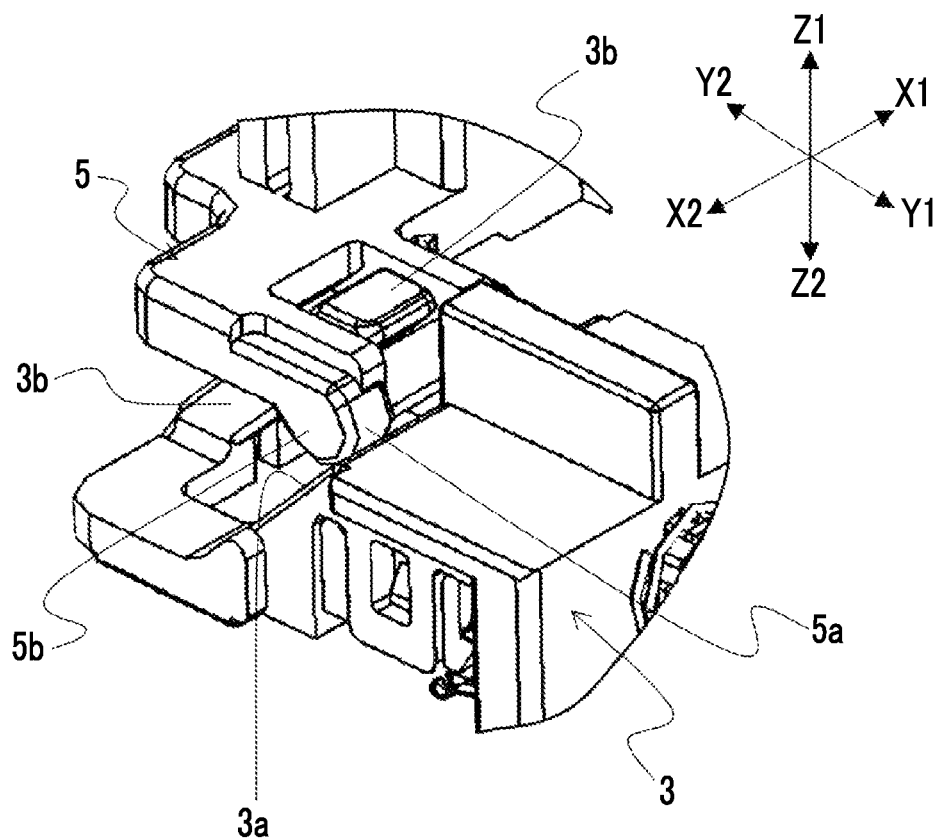
FIGS. 12A and 12B are diagrams showing an engaged state of a first engagement portion and a second engagement portion in the first embodiment.
Figure 12B:
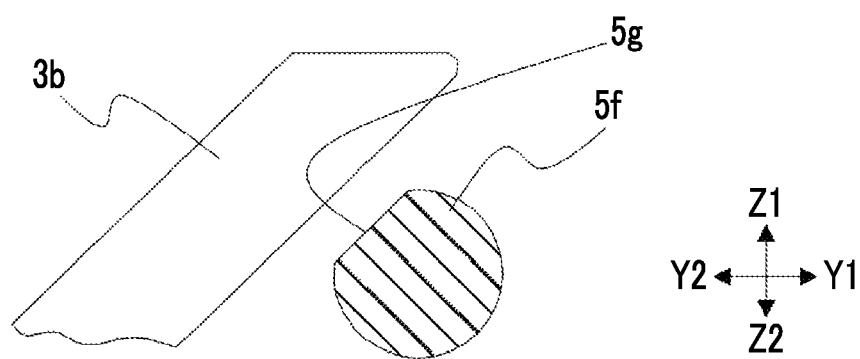
Figure 13A:
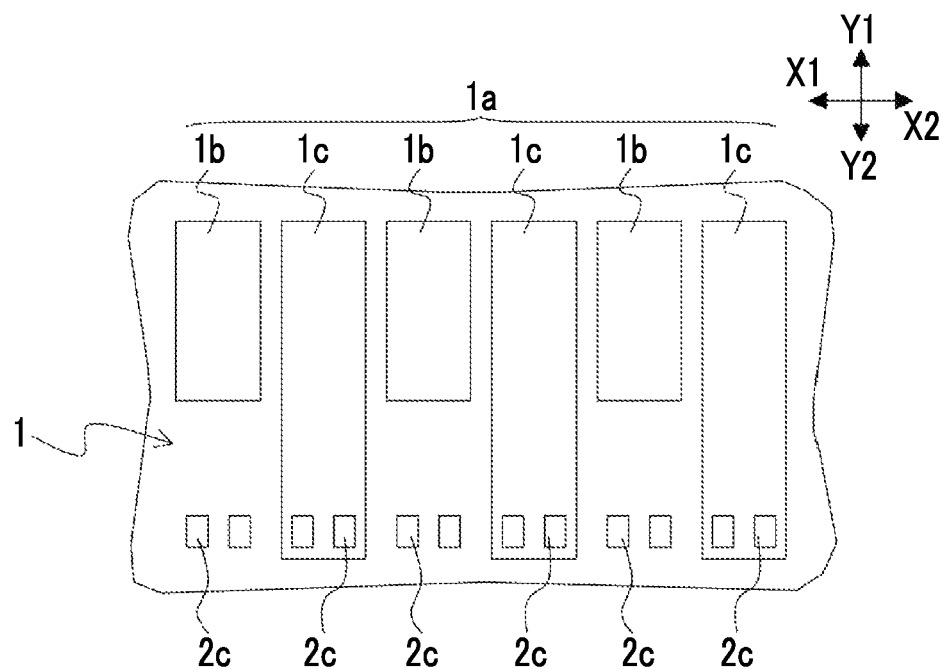
FIGS. 13A and 13B are diagrams showing a connection state of a fixed contact portion and the slider in the first embodiment.
Figure 13B:
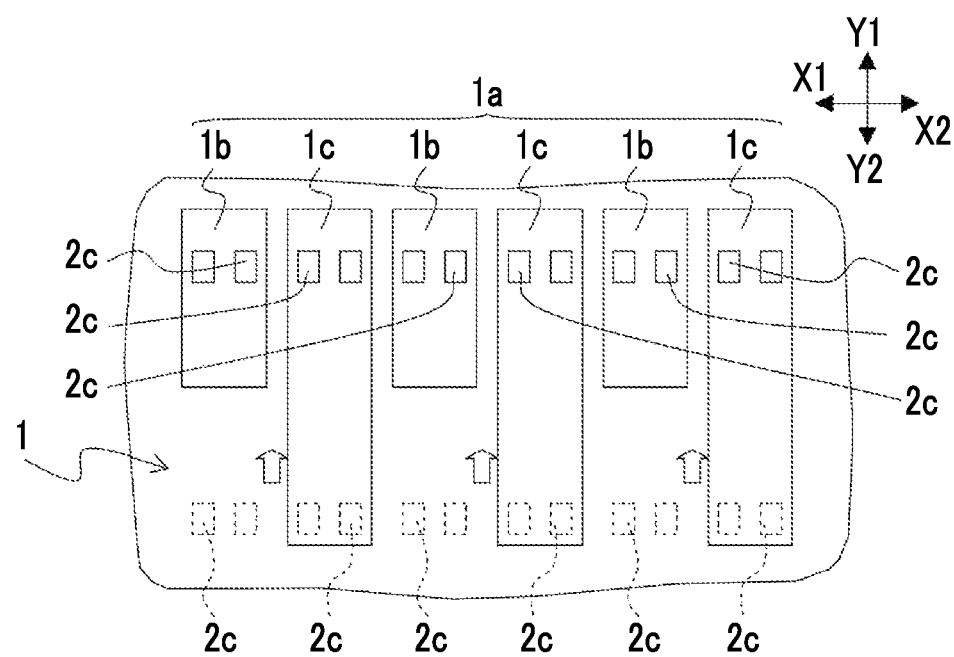

First, the configuration of the switching device 100 in this embodiment will be described using FIGS. 1 to 8B, and 12A to 13B. FIG. 1 is an exploded perspective view showing the configuration of the switching device 100 in the first embodiment. FIG. 2 is a perspective view showing the external appearance of the switching device 100 in the first embodiment. FIG. 3 is a perspective view showing an example of an external appearance in a case where the switching device 100 in the first embodiment is used as a switching device for an operation of a transmission for a vehicle. FIG. 4 is a perspective view showing the external appearance of a slider 2 in the first embodiment. FIGS. 5A and 5B are diagrams showing a first moving member 3 in the first embodiment, in which FIG. 5A is a perspective view showing the external appearance of the first moving member 3 and FIG. 5B is a side view showing the first moving member 3 in a state of being viewed from the X2 direction side shown in FIG. 5A. FIGS. 6A and 6B are diagrams showing a second moving member 5 in the first embodiment, in which FIG. 6A is a perspective view showing the external appearance of the second moving member 5 and FIG. 6B is a side view showing the second moving member 5 in a state of being viewed from the Y1 direction side shown in FIG. 6A. FIGS. 7A and 7B are diagrams showing the second moving member 5 in the first embodiment, in which FIG. 7A is a plan view showing the second moving member 5 in a state of being viewed from the Y2 direction side shown in FIG. 6A and FIG. 7B is a side view showing the second moving member 5 in a state of being viewed from the X2 direction side shown in FIG. 6A. FIGS. 8A and 8B are diagrams showing a biasing unit 60 in the first embodiment, in which FIG. 8A is an exploded perspective view showing the configuration of the biasing unit 60 and FIG. 8B is a perspective view showing the external appearance of the biasing unit 60. FIGS. 12A and 12B are diagrams showing an engaged state of a first engagement portion 3b and a second engagement portion 5b in the first embodiment, in which FIG. 12A is an enlarged view of a portion A shown in FIG. 9 and FIG. 12B is a schematic diagram showing the positional relationship between the first engagement portion 3b and the second engagement portion 5b in a state of being viewed from the X2 direction shown in FIG. 12A. FIGS. 13A and 13B are diagrams showing a connection state of a fixed contact portion 1a and the slider 2 in the first embodiment, in which FIG. 13A is a diagram showing the connection state of the fixed contact portion 1a and the slider 2 at the time of non-operation and FIG. 13B is a diagram showing the connection state of the fixed contact portion 1a and the slider 2 at the time of an operation.

The switching device 100 is a switching device which is provided with a substrate 1, the slider 2, the first moving member 3, a first biasing member 4, the second moving member 5, the biasing unit 60 which includes a second biasing member 6 and a pressing member 7, a case member 8, and an operation member 9, as shown in FIG. 1, and in which an input operation can be made by pressing the operation member 9 provided to protrude from the case member 8, as shown in FIG. 2. In addition, the switching device 100 in this embodiment is used as a switching device for an operation of a transmission for a vehicle, and in a case where the switching device 100 is used as a switching device for an operation of a transmission for a vehicle, the switching device 100 is mounted on the vehicle, for example, in a state where an outer covering as shown in FIG. 3 is attached thereto.

The substrate 1 is made of a rigid substrate such as a glass epoxy substrate, for example, and is formed in a rectangular shape, as shown in FIG. 1, and the fixed contact portion 1a is provided on the upper surface (the surface on the Z1 direction side) thereof. In the fixed contact portion 1a, wiring in which two patterns provided to extend in a direction parallel to a longitudinal direction (a Y1-Y2 direction) of the substrate 1 form a set is provided in three sets. In addition, the wiring in which two patterns form a set is configured with two patterns having different lengths, a first pattern 1b and a second pattern 1c which is longer than the first pattern 1b, as shown in FIGS. 13A and 13B.

The slider 2 is made of a metal thin plate and formed by bending a metal thin plate into a U-shape, as shown in FIG. 4. The slider 2 is composed of three sliding members 2e, and each of the sliding members 2e is provided with a mounting plate portion 2a formed in a flat plate shape, and a connection portion 2b is formed to bifurcate and extend downward (in a Z2 direction) on one end side (the Y1 direction-side end side) of the mounting plate portion 2a, and a sliding end portion 2c is formed to extend toward the other end side of the mounting plate portion 2a on a lower end of the connection portion 2b. The sliding end portion 2c bifurcates on the extension direction side (the Y2 direction side), and thus a sliding contact portion 2d is formed therein. The sliding contact portion 2*d* formed in a cantilever shape has elasticity with respect to an up-and-down direction. Further, two sliding contact portions 2*d* are provided so as to fit into the width dimension (the dimension in an X1-X2 direction) of a single first pattern 1*b* or a single second pattern 1*c*.

The first moving member 3 is made of a synthetic resin material, is formed in a substantially rectangular parallelepiped shape, as shown in FIGS. 5A and 5B, and linearly moves along first imaginary axis line VL1 when being incorporated into the switching device 100. The first moving member 3 has a base portion 3*c* formed in a substantially rectangular parallelepiped shape. The base portion 3*c* has, on one end side (the Y2 direction side), an inclined portion 3*a* formed into a flat surface inclined with respect to the bottom surface (the surface on the Z2 direction side) of the base portion 3*c*. Further, the first moving member 3 has a tongue portion 3*d* formed to extend in a plate shape in the Y2 direction from a lower end of the inclined portion 3*a* so as to be flush with the bottom surface of the base portion 3*c*. Further, the first moving member 3 has a first engagement portion 3*b* formed in a rod shape or a ring shape.

However, in this embodiment, the first moving member 3 is formed as follows. The first moving member 3 has, at the center of an end portion in an extension direction of the tongue portion 3*d* in a plan view, the first engagement portion 3*b* formed to protrude upward (in the Z1 direction) in a rod shape so as to be parallel to the inclined portion 3*a*. The first engagement portion 3*b* extends to a position higher than the upper surface of the base portion 3*c*. Further, the first moving member 3 has a biasing member retaining portion 3*e* formed to protrude in a substantially conical shape from the position of the center in the X1-X2 direction of the surface on the other end side of the base portion 3*c* and also has a guide portion 3*f* formed to protrude in a plate shape which bisects the upper surface of the base portion 3*c* in the X1-X2 direction. Further, the first moving member 3 has a slider disposition portion 3*g* on which the slider 2 can be disposed, on the bottom surface of the base portion 3*c*. In addition, first imaginary axis line VL1 is a line parallel to the central axis of the biasing member retaining portion 3*e* formed in a substantially conical shape.

The first biasing member 4 is a coil spring, as shown in FIG. 1. The coil inner diameter of the first biasing member 4 is formed in a size in which the biasing member retaining portion 3*e* of the first moving member 3 can be inserted.

The second moving member 5 is made of a synthetic resin material, is formed in a substantially rectangular parallelepiped shape, as shown in FIGS. 6A to 7B, and linearly moves along second imaginary axis line VL2 when being incorporated into the switching device 100. The second moving member 5 has a base portion 5*d* formed in a rectangular parallelepiped shape, and the central axis in a longitudinal direction (a Z1-Z2 direction) of the base portion 5*d* and second imaginary axis line VL2 are parallel to each other, and in this embodiment, the central axis in the longitudinal direction of the base portion 5*d* and second imaginary axis line VL2 coincide with each other.

Further, the second moving member 5 is provided with a second engagement portion 5*b*, and the second engagement portion 5*b* is formed in a ring shape in a case where the first engagement portion 3*b* is of a rod shape, and formed in a rod shape in a case where the first engagement portion 3*b* is of a ring shape. In this embodiment, since the first engagement portion 3*b* is formed in a rod shape, the second engagement portion 5*b* is formed in a ring shape. The second engagement portion 5*b* is provided to extend in a plate shape from a lower end (a Z2 direction-side end portion) of the base portion 5*d* to one side (the X2 direction) in a width direction, and is provided to further extend to one side (the Y1 direction side) in a thickness direction. A portion of the second engagement portion 5*b*, which is provided to extend to one side in the thickness direction, is formed in a ring shape having a size in which the first engagement portion 3*b* of the first moving member 3 can be inserted. In addition, the second engagement portion 5*b* has a bridge portion 5*f* formed so as to form a linear bridge in a direction orthogonal to second imaginary axis line VL2 on the tip side provided to extend. The bridge portion 5*f* has a substantially circular cross-sectional shape, as shown in FIG. 12B, and at a portion facing the Z1 direction side on the Y2 direction side, a chamfered portion 5*g* chamfered over the entirety thereof is formed.

Further, the second moving member 5 has an insertion concave portion 5*e* formed in a concave shape having a rectangular cross-section in the upper surface of the base portion 5*d*. Further, the second moving member 5 is provided with a contact portion 5*a*, and the contact portion 5*a* is formed like the outer peripheral surface of a cylinder over a range from the side surface (the surface on the Y1 direction side) of the tip of the second engagement portion 5*b* to the lower surface, as shown in FIG. 7B. Further, as shown in FIG. 7A, the second moving member 5 has a cam portion 5*c* on the side surface (the side surface in the X1-X2 direction) which does not intersect second imaginary axis line VL2, and the cam portion 5*c* is composed of a plurality of continuous inclined surfaces and is formed such that the distance between second imaginary axis line VL2 and the cam portion 5*c* becomes wider (DS2>DS1) as it goes toward a second direction DR2 (the Z1 direction). In addition, in this embodiment, the cam portions 5*c* are formed so as to form a symmetrical shape with the second imaginary axis line VL2 interposed therebetween, on two side surfaces (the surface on the X1 direction side and the surface on the X2 direction side of the base portion 5*d*) facing in opposite directions.

The biasing unit 60 is formed to include the second biasing member 6, the pressing member 7, and a retaining case 60*a*, as shown in FIGS. 8A and 8B. The second biasing member 6 is a coil spring. The pressing member 7 is made of a synthetic resin material and has a slide portion 7*a* formed in a rectangular parallelepiped shape, and a contact convex portion 7*b* is formed to protrude from the surface on one side (the surface in the X2 direction) of the slide portion 7*a*. The thickness dimension in the up-and-down direction (the Z1-Z2 direction) of the contact convex portion 7*b* becomes smaller as it goes toward the tip, and a midpoint position in the up-and-down direction becomes the tip. The retaining case 60*a* is made of a synthetic resin material and formed in a rectangular parallelepiped shape. The retaining case 60*a* has a retaining space 60*b* which is opened at the surface on one side so as to be able to accommodate the second biasing member 6 and the pressing member 7 inside.

The pressing member 7 is accommodated in the retaining space 60*b* of the retaining case 60*a* such that the contact convex portion 7*b* protrudes to the outside, and is disposed so as to be movable along the retaining space 60*b*. Further, the second biasing member 6 is disposed in the retaining space 60*b* in a state of being sandwiched between the pressing member 7 and the retaining case 60*a* and biases the pressing member 7 to one side (the X2 direction side). Therefore, in the biasing unit 60, the pressing member 7 is biased by the second biasing member 6 and the pressing member 7 is movable against the biasing force of the second biasing member 6. In this embodiment, two biasing units 60 are used.

The operation member 9 is made of a synthetic resin material and has an operation button portion 9a formed in a rectangular parallelepiped shape and a connection portion 9b formed to protrude downward on the lower surface (the surface on the Z2 direction side) of the operation button portion 9a, as shown in FIG. 1. The connection portion 9b is formed to protrude in a rod shape having a rectangular cross-section and has a size capable of being inserted into the insertion concave portion 5e of the second moving member 5.

The case member 8 is made of a synthetic resin material and composed of an upper case member 8a and a lower case member 8b, as shown in FIG. 1, and the upper case member 8a is disposed to overlap an upper portion of the lower case member 8b and locked thereto, whereby the case member 8 is formed. The upper case member 8a has an accommodation space 8c which is opened at the lower surface (the surface on the Z2 direction side) and in which the inside is formed in a hollow shape capable of accommodating and retaining other components. Further, the upper case member 8a has, on the upper side, a guide hole 8d that is a through-hole connected to the accommodation space 8c. The guide hole 8d has a rectangular cross-section and is formed in a size in which the connection portion 9b of the operation member 9 and the base portion 5d of the second moving member 5 can be inserted. The lower case member 8b is formed in a plate shape and formed in a shape capable of covering the accommodation space 8c of the upper case member 8a.

Figure 10:
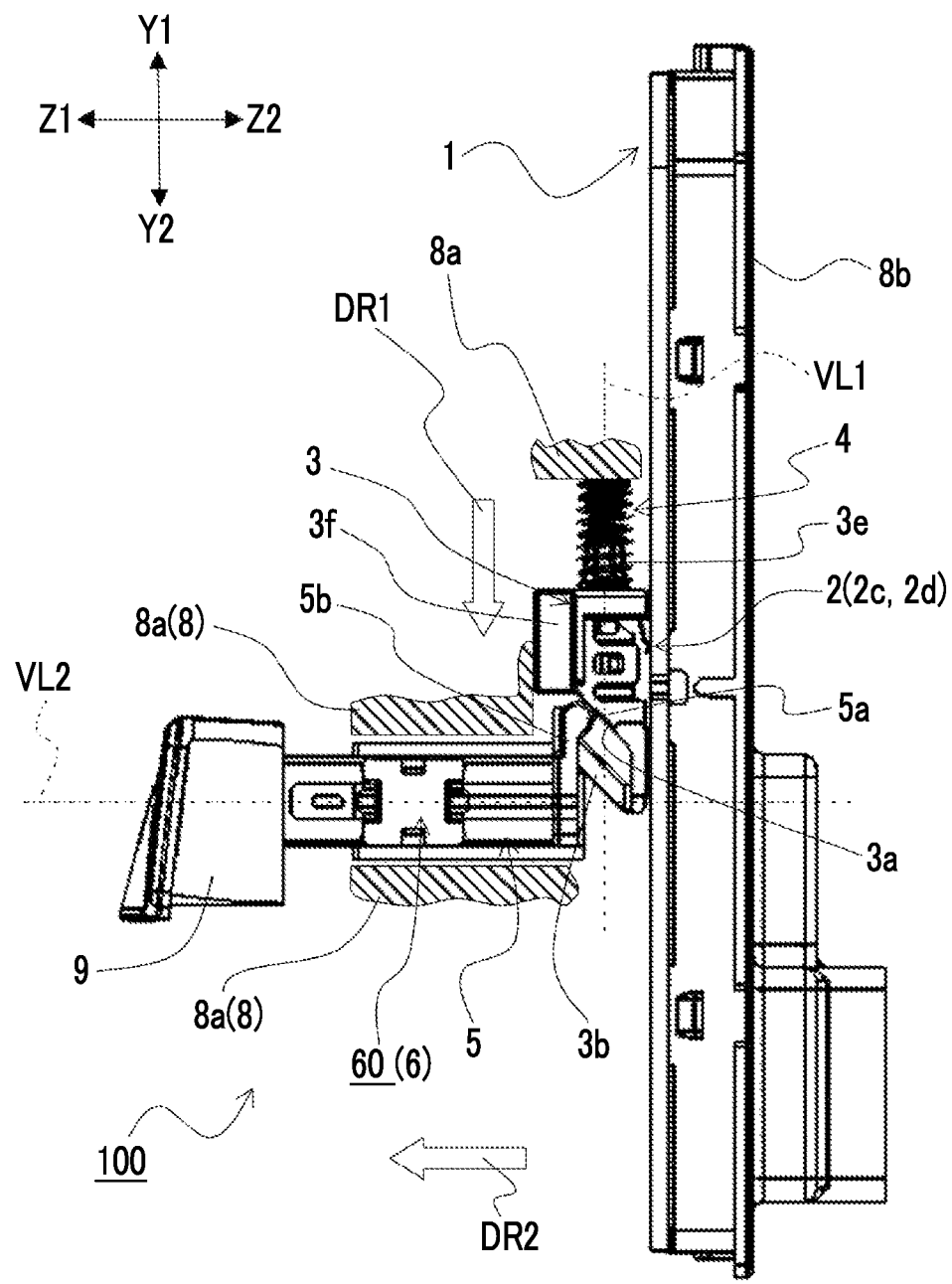
FIG. 10 is a side view showing the switching device in a state of being viewed from the X2 direction side in FIG. 9.
Figure 11:
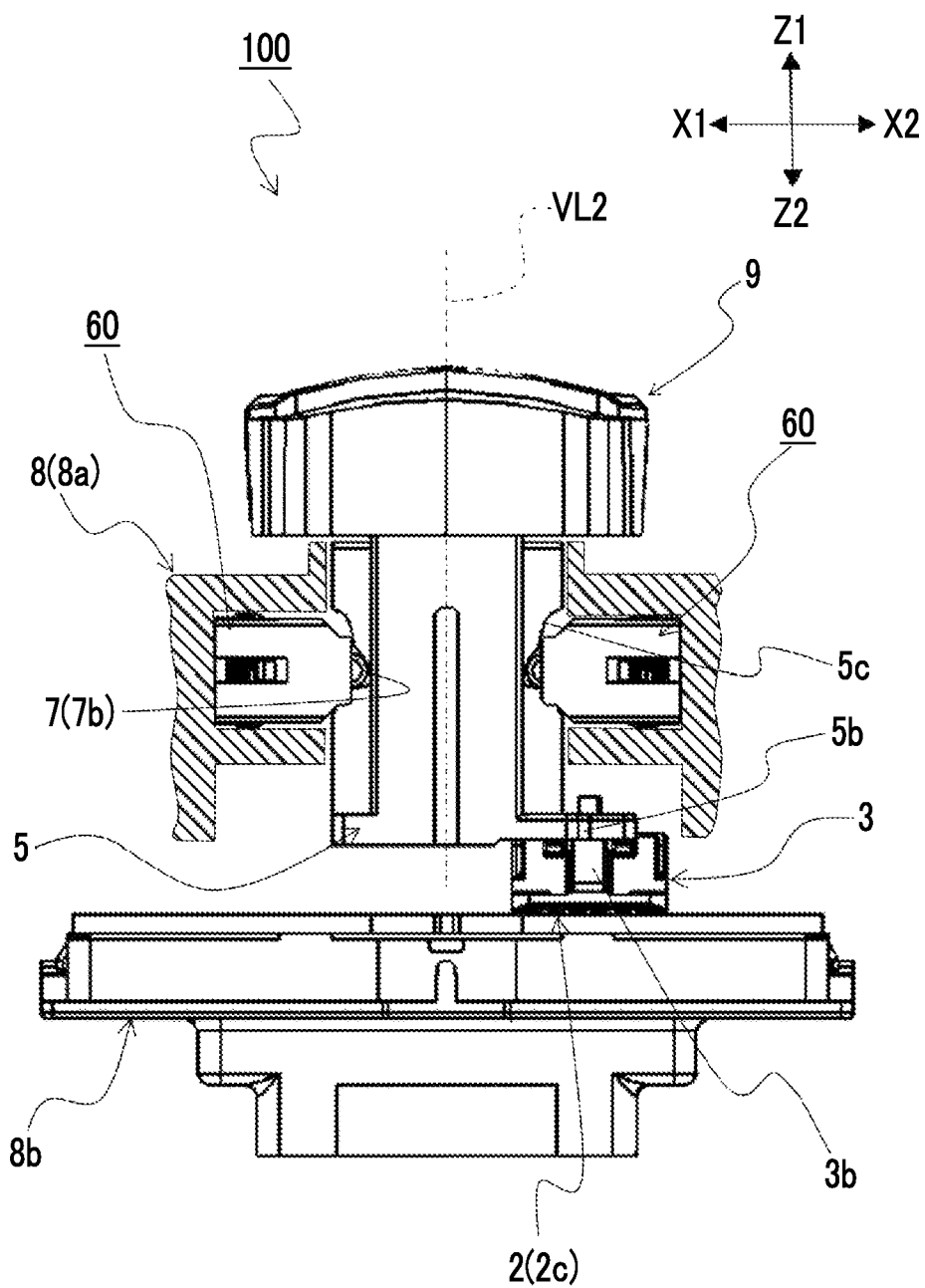
FIG. 11 is a side view showing the switching device in a state of being viewed from the Y2 direction side in FIG. 9.

Next, the structure of the switching device 100 will be described using FIGS. 9 to 13B. FIG. 9 is a perspective view showing the structure of the switching device 100 in the first embodiment. FIG. 10 is a side view showing the switching device 100 in a state of being viewed from the X2 direction side in FIG. 9. FIG. 11 is a side view showing the switching device 100 in a state of being viewed from the Y2 direction side in FIG. 9. In addition, in FIGS. 9 to 11, the upper case member 8a is not described or only a portion thereof is described. FIGS. 12A and 12B are diagrams showing the portion A shown in FIG. 9, in which FIG. 12A is a perspective view showing in an enlarged manner the portion A shown in FIG. 9 and FIG. 12B is a schematic diagram showing the engaged state of the first engagement portion 3b and the second engagement portion 5b in FIG. 12A.

The substrate 1 is disposed to overlap the lower case member 8b with the fixed contact portion 1a (refer to FIG. 1) facing upward, as shown in FIG. 9. In the slider 2, as shown in FIG. 10, the sliding end portion 2c (the sliding contact portion 2d) protrudes downward (in the Z2 direction) and the mounting plate portion 2a (refer to FIG. 4) is retained by the slider disposition portion 3g (refer to FIGS. 5A and 5B) of the first moving member 3. The first moving member 3 is disposed on the substrate 1 such that first imaginary axis line VL1 is parallel to the substrate 1 and the respective sliding contact portions 2d of the slider 2 can come into contact with the fixed contact portion 1a. Further, the first moving member 3 is retained by the upper case member 8a such that the guide portion 3f can slide. The first moving member 3 disposed in this manner can reciprocate on first imaginary axis line VL1 parallel to the substrate 1, and the inclined portion 3a is disposed to be inclined with respect to the substrate 1.

The first biasing member 4 is pressed and sandwiched between the first moving member 3 and the upper case member 8a with one end retained by the biasing member retaining portion 3e of the first moving member 3 and the other end brought into contact with a portion of the upper case member 8a. In this way, the first moving member 3 is biased in a first direction DR1 (the Y2 direction).

The second moving member 5 is disposed so as to be able to reciprocate on second imaginary axis line VL2 intersecting first imaginary axis line VL1 in a plan view from the side, as shown in FIG. 10, in a state where the contact portion 5a slideably comes into contact with the inclined portion 3a of the first moving member 3 and the base portion 5d is inserted into the guide hole 8d of the case member 8. Further, the first moving member 3 and the second moving member 5 disposed in this manner are connected by the first engagement portion 3b and the second engagement portion 5b.

In addition, the first engagement portion 3b and the second engagement portion 5b are configured so as to be connected by inserting one side formed in a rod shape into the other side formed in a ring shape without contact, and in this embodiment, as shown in FIGS. 12A and 12B, a connection is made by inserting the first engagement portion 3b into the second engagement portion 5b without contact. In addition, the chamfered portion 5g of the second engagement portion 5b is disposed to face the first engagement portion 3b so as to be parallel to the first engagement portion 3b.

The first moving member 3 and the second moving member 5 connected in this manner are supported by the case member 8 so as to be able to reciprocate each other in a state where the inclined portion 3a and the contact portion 5a come into sliding contact with each other. The biasing units 60 are retained by the case member 8 such that the pressing members 7 (the contact convex portions 7b) come into contact with the cam portions 5c provided on both sides (the X1 direction side and the X2 direction side) in the width direction of the second moving member 5 and sandwich the second moving member 5 therebetween, as shown in FIG. 11.

In addition, the second biasing member 6 presses the pressing member 7, and the pressing member 7 is in pressure contact with the cam portion 5c. That is, the second biasing member 6 biases the second moving member 5 through the pressing member 7 and moves the second moving member 5 in a direction in which a state is created where the biasing unit 60 biases a place where the distance between the cam portions 5c formed in a symmetrical shape with second imaginary axis line VL2 interposed therebetween is the smallest.

In this manner, the first moving member 3 biased by the first biasing member 4 (refer to FIG. 10) and the second moving member 5 biased by the second biasing member 6 are stabilized in a state where the biasing units 60 bias a place where the distance between the cam portions 5c is the smallest and a state where the contact portion 5a (refer to FIG. 10) comes into contact with the inclined portion 3a (refer to FIG. 10). That is, in a plan view from the side, as shown in FIG. 10, the first biasing member 4 biases the first moving member 3 so as to move the first moving member 3 in the first direction DR1 that is a direction toward the intersection of first imaginary axis line VL1 and second imaginary axis line VL2, and the second biasing members 6 bias the second moving member 5 so as to move the second moving member 5 in the second direction DR2 that is a direction away from the intersection, and the first moving member 3 and the second moving member 5 are stably maintained at a place where such biasing forces are balanced. Further, at this time, the sliding end portion 2c of the slider 2 enters a state where the sliding end portion 2c does not come into contact with the first pattern 1b of the fixed contact portion 1a and comes into contact with the second pattern 1c, as shown in FIG. 13A. In this way, the switching device 100 is formed.

Figure 14A:
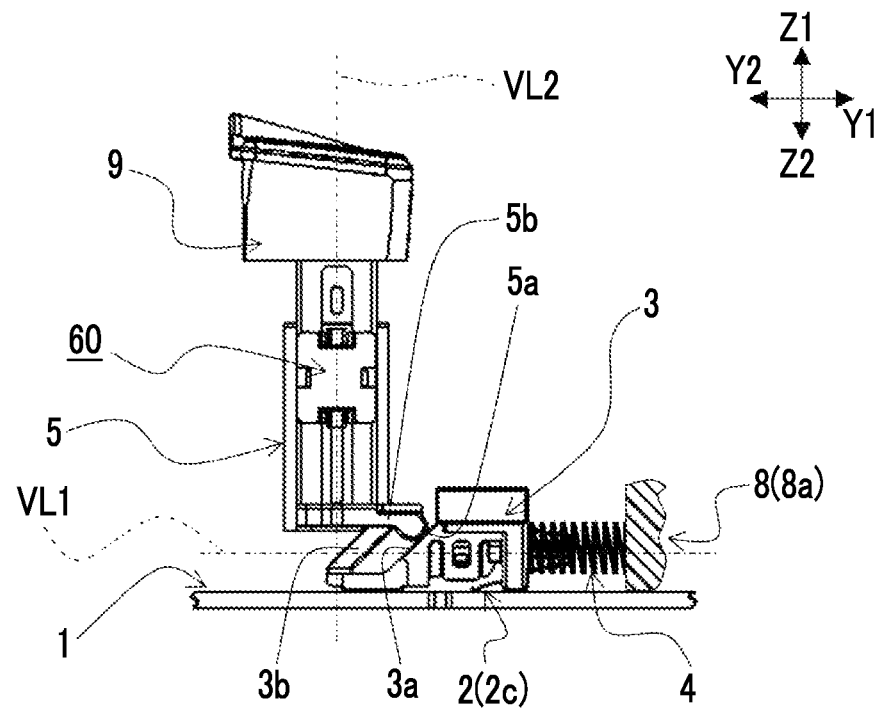
FIGS. 14A and 14B are diagrams showing the positional relationship between the first moving member and the second moving member at the time of non-operation in the first embodiment.
Figure 14B:
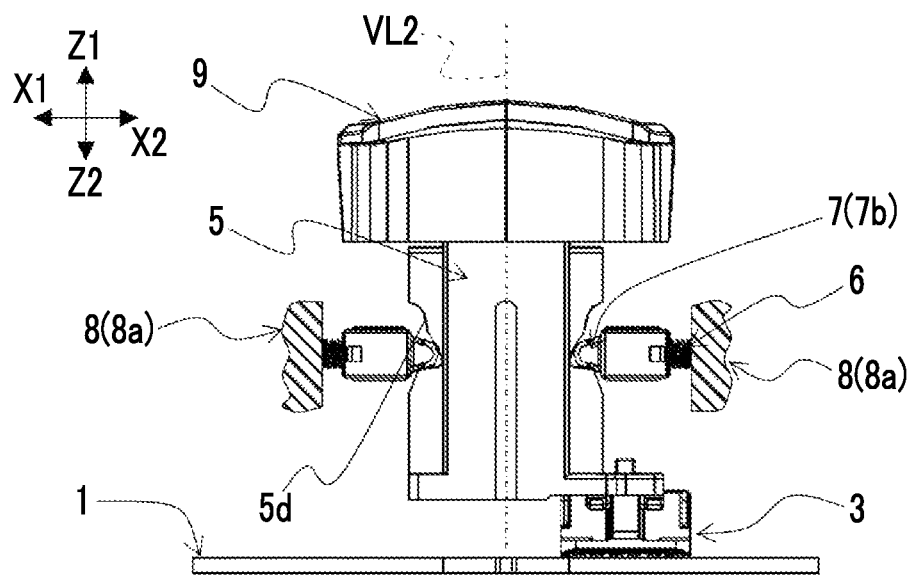
Figure 15A:
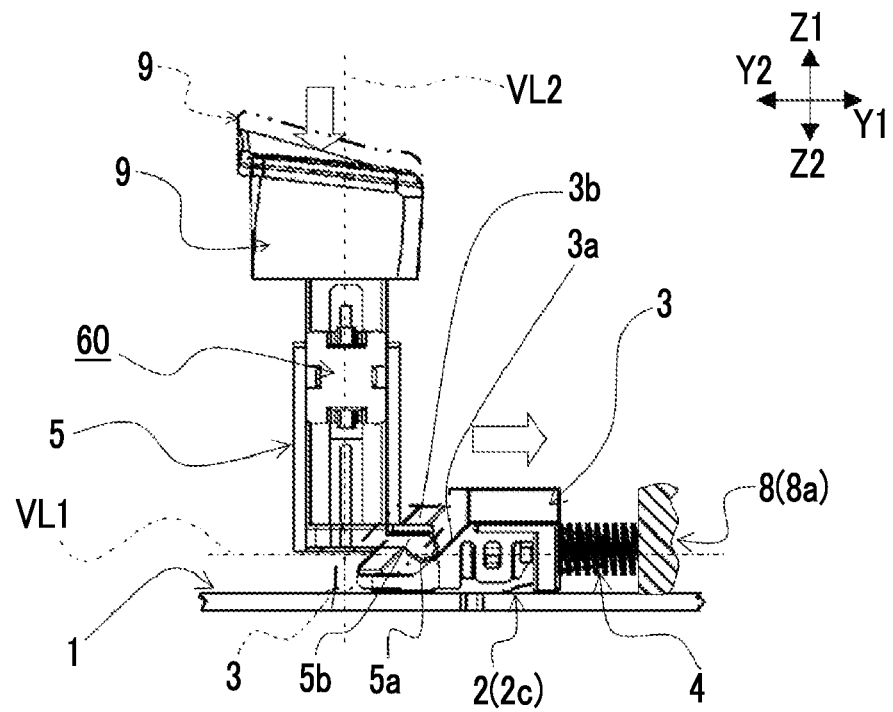
FIGS. 15A and 15B are diagrams showing the positional relationship between the first moving member and the second moving member after an operation in the first embodiment.
Figure 15B:
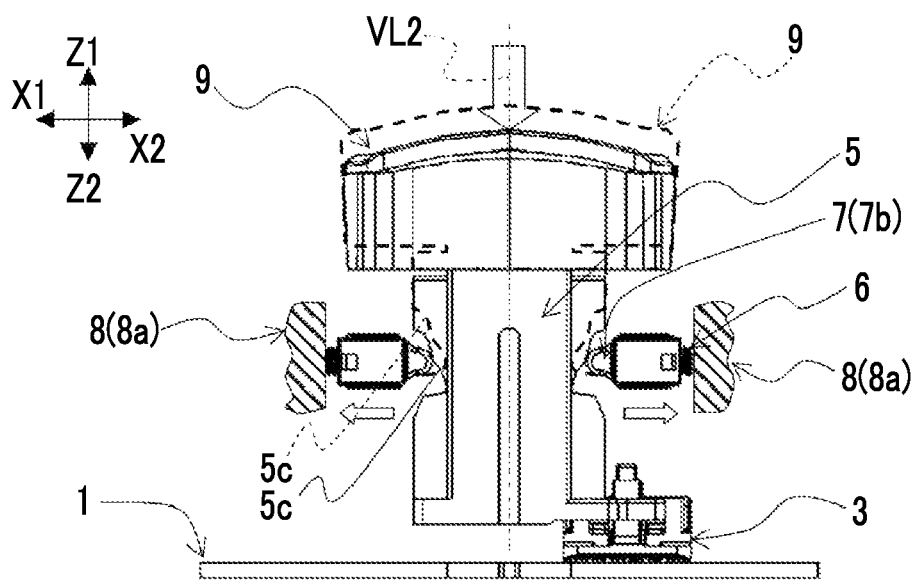

Next, an operation of the switching device 100 will be described using FIGS. 13A to 15B. FIGS. 14A and 14B are diagrams showing the positional relationship between the first moving member 3 and the second moving member 5 at the time of non-operation in the first embodiment, in which FIG. 14A is a side view showing the positional relationship between the first moving member 3 and the second moving member 5 at the time of non-operation and FIG. 14B is a side view showing the positional relationship between the first moving member 3 and the second moving member 5 in a state of being viewed from the Y2 direction side shown in FIG. 14A. FIGS. 15A and 15B are diagrams showing the positional relationship between the first moving member 3 and the second moving member 5 after an operation in the first embodiment, in which FIG. 15A is a side view showing the positional relationship between the first moving member 3 and the second moving member 5 at the time of non-operation and FIG. 15B is a side view showing the positional relationship between the first moving member 3 and the second moving member 5 in a state of being viewed from the Y2 direction side shown in FIG. 15A. In addition, in FIGS. 14A to 15B, only a portion of the case member 8 is shown. Further, in FIGS. 14B and 15B, the retaining case 60a of the biasing unit 60 is not shown.

In the switching device 100, at the time of non-operation, as shown in FIGS. 14A and 14B, the second moving member 5 is maintained in a state where a portion where the distance between the cam portions 5c disposed symmetrically is the smallest is biased by the biasing units 60 from both sides. At this time, in the fixed contact portion 1a and the slider 2, as shown in FIG. 13A, the sliding end portion 2c of the slider 2 is on one end side (the Y2 direction side) of the fixed contact portion 1a and is in contact with the second pattern 1c, but is not in contact with the first pattern 1b, and the first pattern 1b and the second pattern 1c are not electrically connected.

In the switching device 100, if the operation member 9 is pressed, as shown in FIGS. 15A and 15B, the second moving member 5 connected to the operation member 9 moves downward (in the Z2 direction) along second imaginary axis line VL2. At this time, the pressing members 7 move in a direction in which the distance between the pressing members 7 becomes more distant, against the biasing forces of the second biasing members 6 by the cam portions 5c. Further, in the contact portion 5a of the second moving member 5 and the inclined portion 3a of the first moving member 3, since the contact portion 5a is in contact with the inclined portion 3a so as to be slideable along the inclined portion 3a, if the second moving member 5 moves downward, the inclined portion 3a is pressed downward by the contact portion 5a.

A component force in the Y1 direction is applied to the inclined portion 3a pressed downward, and thus the first moving member 3 is pressed in the Y1 direction. The first moving member 3 pressed in the Y1 direction moves in the Y1 direction along first imaginary axis line VL1 against the biasing force of the first biasing member 4. In addition, the first moving member 3 and the second moving member 5 move in conjunction with each other without contact between the first engagement portion 3b and the second engagement portion 5b. The first moving member 3 moves in the Y1 direction, whereby the slider 2 retained by the first moving member 3 also slides in the Y1 direction on the fixed contact portion 1a, and thus the sliding end portions 2c of the slider 2 move to the other end side (the Y1 direction side) of the fixed contact portion 1a and come into contact with the first pattern 1b and the second pattern 1c, as shown in FIG. 13B. The first pattern 1b and the second pattern 1c which are paired are electrically connected through the sliding member 2e.

Further, if the pressing on the operation member 9 is released, since the second biasing members 6 press the cam portions 5c through the pressing members 7, the pressing members 7 move to a place where the distance between the cam portions 5c is the shortest, along the cam portions 5c such that the cam portions 5c symmetrically formed on both sides in the width direction (the X1-X2 direction) of the second moving member 5 are sandwiched therebetween. That is, the second moving member 5 is moved upward by the biasing forces of the second biasing members 6.

Further, the second moving member 5 moves upward, whereby a force in a direction against the biasing force of the first biasing member 4 is weakened, and thus the first moving member 3 is biased in the Y2 direction by the biasing force of the first biasing member 4, thereby returning to the state at the time of non-operation shown in FIGS. 14A and 14B. Further, in the fixed contact portion 1a and the slider 2, electrical connection between the first pattern 1b and the second pattern 1c is released, as shown in FIG. 13A.

In this manner, the slider 2 comes into contact with and is separated from the fixed contact portion 1a according to the reciprocating movement of the first moving member 3, whereby an electrical connection state of the fixed contact portion 1a is switched according to a pressing operation on the operation member 9, and thus an operator can perform an input operation by using the switching device 100.

Figure 16A:
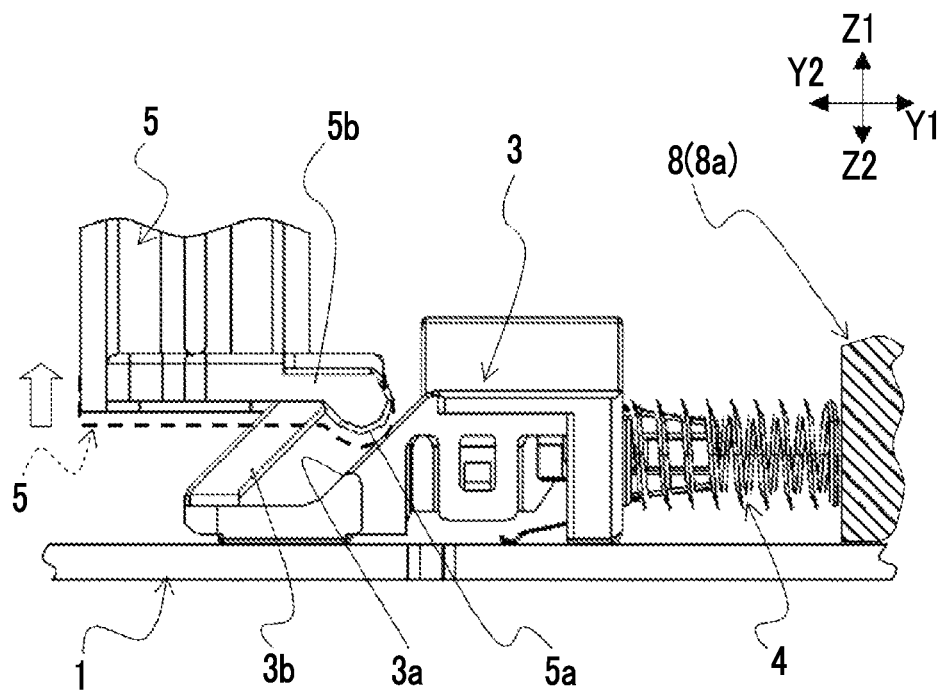
FIGS. 16A and 16B are diagrams showing the engaged state of the first engagement portion and the second engagement portion in a case where the first moving member in the first embodiment has temporarily had difficulty to return to the position before an operation.
Figure 16B:
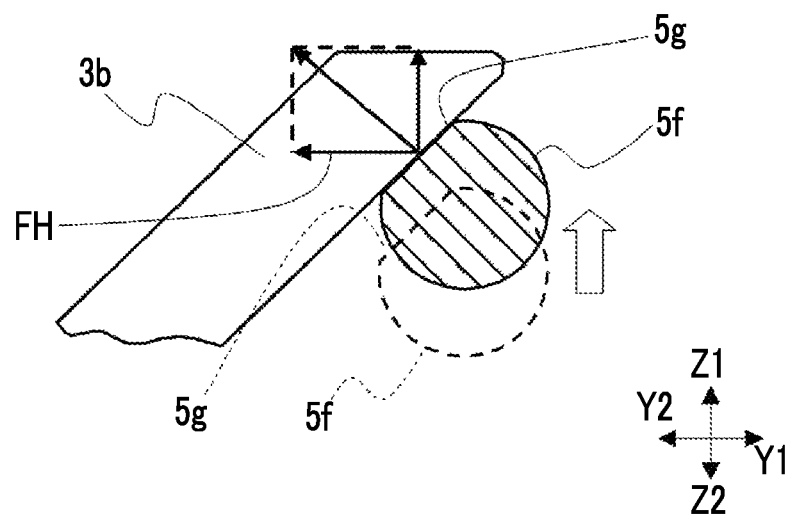
Figure 17:
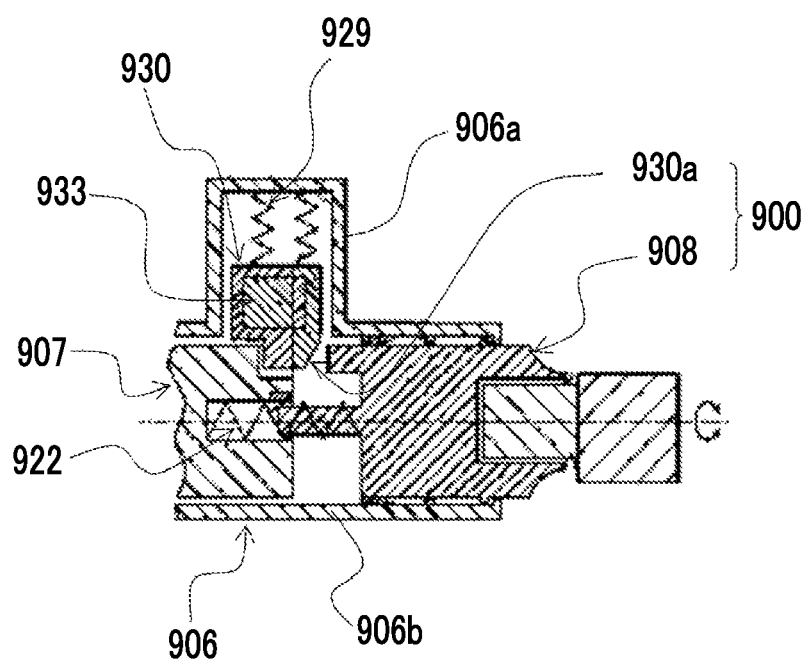
FIG. 17 is a cross-sectional view showing the configuration of a direction conversion mechanism used in a lever device described in Japanese Unexamined Patent Application Publication No. 11-245680.
Figure 18:
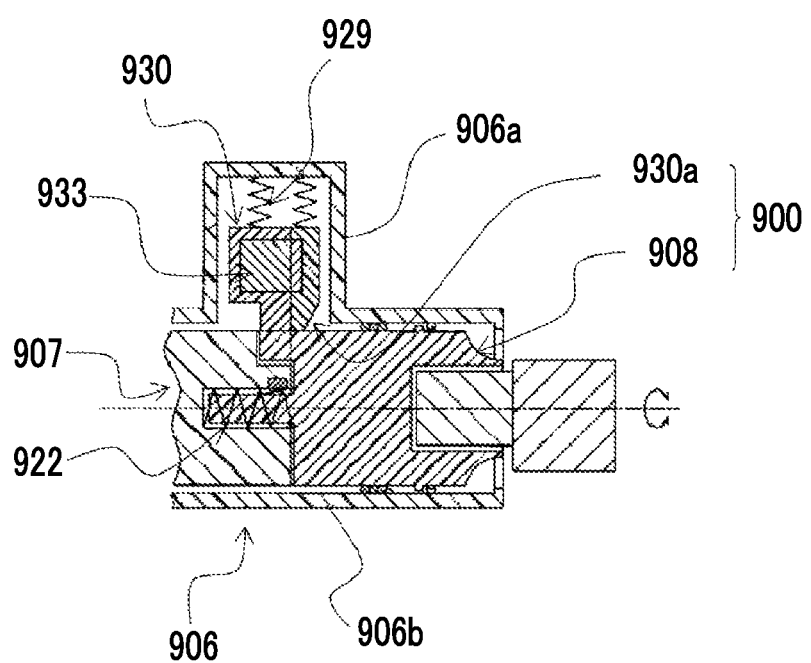
FIG. 18 is a cross-sectional view showing a configuration in a case where the direction conversion mechanism described in Japanese Unexamined Patent Application Publication No. 11-245680 has been operated.

Hereinafter, the effects according to this embodiment will be described. In addition, FIGS. 16A and 16B are diagrams showing the engaged state of the first engagement portion 3b and the second engagement portion 5b in a case where the first moving member 3 in the first embodiment has temporarily had difficulty to return to the position before an operation, in which FIG. 16A is a diagram showing the positional relationship between the first moving member 3 and the second moving member 5 in a case where the first moving member 3 has temporarily had difficulty to return to the position before an operation and FIG. 16B is a schematic diagram showing the engaged state of the first engagement portion 3b and the second engagement portion 5b in a case where the first moving member 3 has temporarily had difficulty to return to the position before an operation.

In the switching device 100 of this embodiment, a configuration is made in which the switching device 100 has the substrate 1 provided with the fixed contact portion 1a; the slider 2 capable of coming into contact with and being separated from the fixed contact portion 1a; the first moving member 3 which is provided with the inclined portion 3a inclined with respect to the substrate 1 and can reciprocate on first imaginary axis line VL1 parallel to the substrate 1; the first biasing member 4 which biases the first moving member 3; the second moving member 5 which is provided with the contact portion 5a coming into sliding contact with the inclined portion 3a and can reciprocate on second imaginary axis line VL2 intersecting first imaginary axis line VL1; and the second biasing member 6 which biases the second moving member 5, in which the first biasing member 4 biases the first moving member 3 so as to move the first moving member 3 in the first direction DR1 that is a direction toward the intersection of first imaginary axis line VL1 and second imaginary axis line VL2, the second biasing member 6 biases the second moving member 5 so as to move the second moving member 5 in the second direction DR2 that is a direction away from the intersection, the first moving member 3 and the second moving member 5 are respectively supported so as to be able to reciprocate in a state of bringing the inclined portion 3a and the contact portion 5a into sliding contact with each other, the slider 2 is retained by the first moving member 3, the slider 2 comes into contact with and is separated from the fixed contact portion 1a according to the reciprocating movement of the first moving member 3, the first moving member 3 is provided with the first engagement portion 3b, the second moving member 5 is provided with the second engagement portion 5b, and the first moving member 3 and the second moving member 5 are connected by the first engagement portion 3b and the second engagement portion 5b so as to be able to reciprocate each other.

In this way, a configuration is made in which the first moving member 3 and the second moving member 5 are connected by the first engagement portion 3b and the second engagement portion 5b so as to be able to reciprocate each other. In use of the switching device, a state is assumed in which after the pressing operation on the second moving member 5 is stopped, the first moving member 3 trying to return to the position before an operation has difficulty to return for a reason such as small foreign matter being caught. In such a case, since the first engagement portion 3b of the first moving member 3 and the second engagement portion 5b of the second moving member 5 are engaged with each other, the first moving member 3 is biased not only by the first biasing member 4, but also by the second biasing member 6 in the same direction as the first biasing member 4. Therefore, even in a state where in the configuration of the related art, return is not made due to foreign matter being caught, the first moving member 3 pushes the foreign matter away and easily returns to the position before an operation. Accordingly, the effect of being able to provide a switching device capable of reliably returning to the initial state is exhibited.

Further, in the switching device 100 of this embodiment, a configuration is made in which the first engagement portion 3b is formed in a rod shape, the second engagement portion 5b is formed in a ring shape, and the first engagement portion 3b and the second engagement portion 5b are connected by inserting the first engagement portion 3b into the second engagement portion 5b without contact.

In this way, due to a configuration in which a connection is made by inserting the first engagement portion 3b into the second engagement portion 5b without contact, the effect of being able to performing a connection without interfering with the reciprocation movements of the first engagement portion 3b and the second engagement portion 5b is exhibited. This is because a separation distance between the first engagement portion 3b and the second engagement portion 5b is maintained constantly due to a structure in which the first engagement portion 3b formed in a rod shape is provided to extend parallel to the inclined portion 3a and the contact portion 5a provided at the tip of the second engagement portion 5b slides on the inclined portion 3a.

In a case where a state occurs where the first moving member 3 trying to return to the position before an operation has difficulty to return for a reason such as small foreign matter being caught, only the second moving member 5 usually moves upward, and therefore, the contact portion 5a and the inclined portion 3a are separated from each other, as shown in FIG. 16A, and the first engagement portion 3b and the bridge portion 5f (the chamfered portion 5g) of the second engagement portion 5b come into contact with each other, as shown in FIG. 16B. Since the second engagement portion 5b is biased upward, a biasing force FH in a lateral direction (the Y2 direction) is applied to the first engagement portion 3b. Therefore, the first engagement portion 3b and the second engagement portion 5b are usually separated from each other, whereby a mutual reciprocating movement is not obstructed. However, in a case where a state occurs where it becomes difficult for the first moving member 3 to return to the state before an operation, it is possible to apply the biasing force of the second biasing member 6 to the first moving member 3 too.

Further, in the switching device 100 of this embodiment, a configuration is made in which the second biasing member 6 biases the second moving member 5 through the pressing member 7, the second moving member 5 has the cam portion 5c with which the pressing member 7 comes into contact, on the side surface which does not intersect second imaginary axis line VL2, the cam portion 5c is composed of a plurality of continuous inclined surfaces, and the distance between second imaginary axis line VL2 and the cam portion 5c becomes wider as it goes toward the second direction DR2.

In this way, a configuration is made in which the cam portion 5c composed of a plurality of continuous inclined surfaces is provided on the side surface of the second moving member 5, which does not intersect second imaginary axis line VL2, and the cam portion 5c is biased through the pressing member 7. By adjusting the inclination angle of the inclined surface with respect to the side surface, it is possible to optionally adjust a feeling of a click at the time of an operation. Further, the cam portion 5c has a configuration in which the distance between second imaginary axis line VL2 and the cam portion 5c becomes wider as it goes toward the second direction DR2, whereby when the second moving member 5 is pressed in a reverse direction to the second direction DR2 and then, the pressing operation is released, it is possible to move the second moving member 5 in the second direction DR2 by the biasing force of the second biasing member 6, thereby returning the second moving member 5 to the initial position. Therefore, the effect of being able to provide a switching device in which the adjustment of an operation feeling is easy and which can reliably return to the initial position is exhibited.

Further, in the switching device 100 of this embodiment, a configuration is made in which the cam portions 5c are formed so as to form a symmetrical shape with second imaginary axis line VL2 interposed therebetween, on two side surfaces facing in opposite directions.

In this way, the cam portions 5c are provided so as to form a symmetrical shape with second imaginary axis line VL2 interposed therebetween, on two side surfaces facing in opposite directions, whereby the second moving member 5 is biased so as to be sandwiched between the two pressing members 7, and therefore, it becomes difficult for the second moving member 5 to tilt to one side. Therefore, deterioration of an operation feeling due to the second moving member 5 being tilted and becoming caught on other components hardly occurs. Accordingly, the effect of being able to provide a switching device having a better operation feeling is exhibited.

Further, in the switching device 100 of this embodiment, a configuration is made in which the switching device 100 is for an operation of a transmission for a vehicle.

In this way, the switching device 100 is used for an operation of the transmission for a vehicle, whereby the effect of being able to perform switching of more reliable gear shifting, whereby a driver can drive an automobile without being confused by switching failure, is exhibited.

As described above, the switching device according to an embodiment of the present invention has been specifically described. However, the present invention is not limited to the above-described embodiment and can be variously modified and implemented within a scope which does not depart from the gist. For example, the present invention can be modified and implemented as follows, and these embodiments also belong to the technical scope of the present invention.

Modified Example 1

In the first embodiment, a configuration is made in which the cam portions 5c are formed so as to form a symmetrical shape with second imaginary axis line VL2 interposed therebetween, on two side surfaces facing in the opposite directions of the second moving member 5. However, a configuration is also acceptable in which the cam portion 5c is formed on only one side surface.

Modified Example 2

In the first embodiment, the cam portion 5c is formed with an inclined surface. However, the cam portion 5c may be formed with a curved surface.

Modified Example 3

In the first embodiment, a configuration is made in which the direction of the biasing force of the second biasing member 6 is converted through the pressing member 7 and the cam portion 5c. However, biasing may be made without using a mechanism to convert the direction of the biasing force.

Modified Example 4

In the first embodiment, a configuration is made in which the first engagement portion 3b is formed in a rod shape, the second engagement portion 5b is formed in a ring shape, and the first engagement portion 3b and the second engagement portion 5b are connected by inserting the first engagement portion 3b into the second engagement portion 5b without contact. However, a configuration is also acceptable in which the first engagement portion 3b is formed in a ring shape, the second engagement portion 5b is formed in a rod shape, and the first engagement portion 3b and the second engagement portion 5b are connected by inserting the second engagement portion 5b into the first engagement portion 3b without contact.

Modified Example 5

In the first embodiment, first imaginary axis line VL1 and second imaginary axis line VL2 are disposed substantially orthogonal to each other when viewed from the side. However, first imaginary axis line VL1 and second imaginary axis line VL2 may be disposed so as not to be orthogonal to each other.

It should be understood by those skilled in the art that various modifications, combinations, sub-combinations and alterations may occur depending on design requirements and other factors insofar as they are within the scope of the appended claims of the equivalents thereof.

What is claimed is:

1. A switching device comprising:
a substrate having a fixed contact portion;
a first moving member having an inclined portion inclined with respect to the substrate, the first moving member being configured to reciprocate on a first imaginary axis line parallel to the substrate;
a slider held by the first moving member, the slider being configured to come into contact with and be separated from the fixed contact portion of the substrate according to a reciprocating movement of the first moving member,
a second moving member having a sliding contact portion coming into sliding contact with the inclined portion of the first moving member, the second moving member being configured to reciprocate on a second imaginary axis line intersecting the first imaginary axis line;
a first biasing member that biases the first moving member such that the first moving member moves in a first direction toward an intersection of the first imaginary axis line and the second imaginary axis line; and
a second biasing member that biases the second moving member through a pressing member such that the second moving member moves in a second direction away from the intersection, the second moving member having a cam portion on a side surface thereof which does not intersect the second imaginary axis line, the pressing member coming into contact with the cam portion, the cam portion being formed of a plurality of successive inclined surfaces, and a distance between the second imaginary axis line and the cam portion becoming greater as the second member moves in the second direction,
wherein the first moving member and the second moving member further include a first engagement portion and a second engagement portion, respectively, and are movably coupled with each other by the first and second engagement portions such that the first and second moving members reciprocate with respect to each other while the inclined portion and the sliding contact portion are in sliding contact with each other.

2. The switching device according to claim 1, wherein one of the first engagement portion and the second engagement portion is formed in a rod shape, and the other of the first engagement portion and the second engagement portion is formed in a ring or frame shape, and
wherein the first engagement portion and the second engagement portion are coupled with each other by inserting the one formed in the rod shape into the other formed in the ring or frame shape, without being in contact with each other.

3. The switching device according to claim 1, wherein the cam portion includes a pair of the plurality of successive inclined surfaces formed on opposing two side surfaces of the second moving member in a symmetrical shape with respect to the second imaginary axis line.

4. The switching device according to claim 1, wherein the switching device is configured to operate a transmission for a vehicle.

5. The switching device according to claim 1, wherein the second moving member includes a pair of arms and a bridge member bridging the pair of arms so as to form the second engagement portion, the sliding contact portion being formed on an end of each of the pair of arms.

6. A switching device comprising:

a substrate having a fixed contact portion;

a first moving member having an inclined portion inclined with respect to the substrate, the first moving member being configured to reciprocate on a first imaginary axis line parallel to the substrate;

a slider held by the first moving member, the slider being configured to come into contact with and be separated from the fixed contact portion of the substrate according to a reciprocating movement of the first moving member, a second moving member having a sliding contact portion coming into sliding contact with the inclined portion of the first moving member, the second moving member being configured to reciprocate on a second imaginary axis line intersecting the first imaginary axis line;

a first biasing member that biases the first moving member such that the first moving member moves in a first direction toward an intersection of the first imaginary axis line and the second imaginary axis line; and a second biasing member that biases the second moving member such that the second moving member moves in a second direction away from the intersection, wherein the first moving member and the second moving member further include a first engagement portion and a second engagement portion, respectively, and are movably coupled with each other by the first and second engagement portions such that the first and second moving members reciprocate with respect to each other while the inclined portion and the sliding contact portion are in sliding contact with each other, wherein the second moving member includes a pair of arms and a bridge member bridging the pair of arms so as to form the second engagement portion, the sliding contact portion being formed on an end of each of the pair of arms, and wherein the first engagement portion is inserted into a space surrounded by the pair of arms and the bridge member without coming into contact therewith in a normal configuration of the switching device.

* * * * *